(12) United States Patent
Katoh et al.

(10) Patent No.: US 6,323,877 B1
(45) Date of Patent: Nov. 27, 2001

(54) PICTURE DISPLAY UNIT, PICTURE DISPLAY SYSTEM, AND MOVING PICTURE RETRIEVING SYSTEM

(75) Inventors: Tsuyoshi Katoh; Manabu Nakamura; Hitoshi Kato; Shugo Horikami, all of Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/955,621

(22) Filed: Oct. 22, 1997

(30) Foreign Application Priority Data

Oct. 22, 1996 (JP) .................................................. 8-279159
Jun. 2, 1997 (JP) .................................................. 9-143625

(51) Int. Cl.⁷ .................................................. H04N 13/00
(52) U.S. Cl. .................................................. 345/638; 345/650
(58) Field of Search .................................. 345/113, 115, 345/114, 327, 328, 11

(56) References Cited

U.S. PATENT DOCUMENTS

| | | | | |
|---|---|---|---|---|
| 5,144,438 | * | 9/1992 | Kim ...................................... | 358/183 |
| 5,510,838 | * | 4/1996 | Yomdin et al. ....................... | 348/384 |
| 5,521,841 |   | 5/1996 | Farshid et al. . | |
| 5,724,446 | * | 3/1998 | Liu et al. .............................. | 382/233 |
| 5,831,673 | * | 11/1998 | Przyborski et al. .................. | 348/329 |
| 5,841,439 | * | 11/1998 | Pose et al. ............................ | 345/418 |
| 5,867,166 | * | 2/1999 | Myhruold et al. ................... | 345/419 |
| 5,977,977 | * | 11/1999 | Kajiya et al. ........................ | 345/418 |
| 6,008,820 | * | 12/1999 | Chauvin et al. ..................... | 345/502 |
| 6,047,130 | * | 4/2000 | Oles ...................................... | 396/1 |
| 6,055,012 | * | 4/2000 | Haskell ................................. | 348/48 |

FOREIGN PATENT DOCUMENTS

| | | | |
|---|---|---|---|
| 2-113790 | 4/1990 | (JP) | ................................ G06F/15/40 |
| 5-19731 | 1/1993 | (JP) | ................................ G06F/15/40 |
| 5-81348 | 4/1993 | (JP) | ................................ G06F/15/40 |
| WO 95 28794 | 10/1995 | (WO) . | |
| WO 96 12239 | 4/1996 | (WO) . | |

OTHER PUBLICATIONS

Nagasaka et al.: "Automatic Video Indexing And Full–Video Search For. . . ".
Flickner M et al.: "Query By Imagine And Video Content: The Qbic. . . ".
Little T D C et al.: "Selection And Dissemination Of Digital Video . . . ".
Tonomura Y et al.: "Content Oriented Visual Interface using. . . ".

* cited by examiner

Primary Examiner—Steven Sax
(74) Attorney, Agent, or Firm—Israel Gopstein

(57) ABSTRACT

A picture display unit for moving picture retrieval based on multi-scene reproduction. The picture display unit comprises a picture reducing section for reducing picture data, a picture combining section for combining the reduced picture data to produce a combined picture, a picture displaying section for displaying the combined picture, and a simultaneous multi-scene reproducing section for taking the charge of reproduction of picture data. The picture reducing section reduces the picture data in units of frames to be reproduced, and the picture combining section combines the reduced picture data belonging to the same frames of the picture data, and the simultaneous multi-scene reproducing section reproduces this combined picture. This arrangement allows the effective use of the computer rescue and the improvement of the moving picture retrieval efficiency.

12 Claims, 33 Drawing Sheets

FIG. 30

IN THE CASE OF 16 DIVISIONS

MOVING PICTURE DATA 1
(IN THE CASE THAT LENGTH IS 4 MINUTES)

MOVING PICTURE 1

↑

COBINED PICTURE

| MOVING PICTURE 1<br>0 SECOND | MOVING PICTURE 1<br>15 SECONDS | MOVING PICTURE 1<br>30 SECONDS | MOVING PICTURE 1<br>45 SECONDS |
|---|---|---|---|
| MOVING PICTURE 1<br>1 MINUTE AND<br>0 SECOND | MOVING PICTURE 1<br>1 MINUTE AND<br>15 SECONDS | MOVING PICTURE 1<br>1 MINUTE AND<br>30 SECONDS | MOVING PICTURE 1<br>1 MINUTE AND<br>45 SECONDS |
| MOVING PICTURE 1<br>2 MINUTES AND<br>0 SECOND | MOVING PICTURE 1<br>2 MINUTES AND<br>15 SECONDS | MOVING PICTURE 1<br>2 MINUTES AND<br>30 SECONDS | MOVING PICTURE 1<br>2 MINUTES AND<br>45 SECONDS |
| MOVING PICTURE 1<br>3 MINUTES AND<br>0 SECOND | MOVING PICTURE 1<br>3 MINUTES AND<br>15 SECONDS | MOVING PICTURE 1<br>3 MINUTES AND<br>30 SECONDS | MOVING PICTURE 1<br>3 MINUTES AND<br>45 SECONDS |

PICTURE DISPLAY UNIT, PICTURE DISPLAY SYSTEM, AND MOVING PICTURE RETRIEVING SYSTEM

BACKGROUND OF THE INVENTION

1. Field of the Invention

The present invention relates to picture display and moving picture retrieval on a computer, and more particularly to picture display and moving picture retrieval based on multi-scene reproduction.

2. Description of the Prior Art

A prior common simultaneous multi-scene reproducing method is as exemplified by Japanese Unexamined Patent Publication No. 5-19731. As shown in FIG. 33, a picture display unit based upon this simultaneous multi-scene reproducing method features a decoding frame identifying means 3301 for identifying a decoding level on the basis of the number of data of moving pictures to be simultaneously displayed for reproduction, an aiming frame decoding means 3302 for decoding picture data at the decoding level identified by the decoding frame identifying means 3301, and a moving picture reproducing means 3303 for separately reproducing each of the decoded picture data.

In addition, a prior moving picture retrieving method is disclosed in Japanese Unexamined Patent Publication No. 2-113790. According to this retrieving method, as shown in FIG. 34, provided are a typical scene extracting means 3401 for extracting, as scenes, portions of moving picture information representative of a feature of a retrieval picture, a menu picture producing means 3402 for arranging these scenes on the time axis to edit them as menu pictures, and a menu picture reproducing means 3403 for reproducing the menu pictures for retrieval, which achieves the retrieval of a picture coincident with the retrieving object while seeing the menu pictures.

Moreover, so far, as a method of selecting data answering the purpose from moving picture data accumulated, there has been known a moving picture retrieving system disclosed in Japanese Unexamined Patent Publication No. 5-81348. FIG. 35 is a block diagram showing the arrangement of the moving picture retrieving system of Japanese Unexamined Patent Publication No. 5-81348. In this moving picture retrieving system, a reduced picture producing section 3502 produces picture data for display as a moving picture on the basis of picture data of all or a portion of moving picture data frames and further creates a reduced still picture representative of each of the plurality of moving picture data from a portion of each moving picture data. Further, a still picture display unit 3504 arranges and displays the representative pictures based on the moving picture data on a screen of a bit map display 3506, while a scene selecting means 3507 selects the representative picture on the bit map display so that a moving picture display unit 3505 successively displays moving picture display picture data of the moving picture data represented by the selected representative picture on the bit map display 3506 in order.

However, in the prior art, in the case of the simultaneous multi-scenes reproduction, a plurality of reduced scenes are commonly controlled to be respectively allocated to areas defined by dividing the display screen, and for this reason, the control such as decoding is necessary for the allocation (corresponding to the number of moving pictures to be reproduced). In addition, in the case of conducting the simultaneous multi-scene reproduction through a network, there is a need to insure a band of the network corresponding to the moving picture data to be reproduced, and in the case of carrying out the simultaneous multi-scene reproduction within a terminal, the consumption of the system resource occurs by a quantity corresponding to the number of moving pictures to be reproduced.

Furthermore, in the case of the retrieval of moving picture data, since the retrieval object is generally a set of pictures making features of a moving pictures, the retrieval is also performed in terms of similar pictures, with the result that the retrieval efficiency becomes worse and a long processing time is taken.

Still further, there is a problem in that, for designating a retrieval condition from a plurality of terminals and for simultaneously reproducing a plurality of moving pictures different among the respective terminals, in addition to the loads on the terminals and network, the load on the server increases in proportion to the number of terminals to make it difficult to smoothly reproduce moving picture at the plurality of terminals.

Moreover, in the prior method, for finding out the directing scene from the moving picture data being the object of the retrieval, there is a need to reproduce and check the whole moving picture display picture data created in advance, and this retrieval needs to take an extremely long time and much labor.

SUMMARY OF THE INVENTION

It is therefore an object of the present invention to eliminate the troublesome control due to decoding of the moving pictures to be reproduced or the like and further to effectively utilize the band of the network and the system resource in such simultaneous multi-scene reproduction.

Another object of this invention is to, in the case of retrieving moving picture data on the basis of a still picture, speed up the retrieval processing concurrently with preventing an omission of the detection.

A further object of this invention is to provide a moving picture retrieving system which is capable of reproducing a list of moving picture data conforming with or meeting the retrieval condition, each of a plurality of terminals designates, using smooth moving data at the plurality of terminals.

A further object of this invention is to provide a moving picture retrieving system which is capable of quickly and simply searching a scene answering the purpose from moving picture data.

For eliminating the above-mentioned problems, a first aspect of the present invention is that a plurality of moving picture data to be reproduced are reduced in units of frames and combined or synthesized to produce one moving picture which in turn, is reproduced. Whereupon, when the plurality of moving picture data are simultaneously reproduced with multiple scenes, the troublesome control due to the decoding corresponding to the number of moving pictures to be reproduced is eliminable. Further, for example, in the case of transferring this combined picture through a network, the number of streams of data to be forwarded decreases, so that the effective use of the band of the network is possible, and the consumption of the system resource of a computer terminal taking the charge of the reproduction is reducible.

A second aspect of this invention is that, for retrieving moving picture data through the use of a key picture, the key picture is not compared with all the frames within the moving picture data but is compared with a representative frame of each of the scenes of the moving picture data. Thus, when the retrieval is done to the moving picture data by using a still picture as a key, since the frame data undergoing the retrieval lessens, which can speed up the retrieval processing.

A third aspect of this invention is that, for retrieving moving picture data using a key picture, in addition to the comparison of the key picture with the representative frame of each of the scenes of the moving picture data, the representative frame of the scene coinciding therewith in the comparison result is newly registered as a key picture, and further retrieval is conducted through the use of the newly registered key picture, thus preventing the retrieval omission. Accordingly, in the case of retrieving the moving picture data in a manner that a still picture is used as a key, the still pictures servicing as a key increases in number, so that the retrieval omission is preventable.

A fourth aspect of this invention is that, on the server side, a plurality of moving picture data to be reproduced are reduced in units of frames and combined to produce one moving picture, and the combined picture is reproduced on the terminal side. Thus, when the plurality of moving picture data are simultaneously reproduced with multiple scenes, the number of streams of data to be forwarded decreases, so that the effective use of the band of the network for the transmission and reception of the combined picture is possible, and the consumption of the system resource of a computer terminal taking the charge of the reproduction is reducible.

A fifth aspect of this invention is that a moving picture retrieving server extracts a plurality of moving picture data conforming with a retrieval condition, and produces reduced pictures on the basis of moving picture data a picture reducing means extracts from a moving picture storage means, and further combines the reduced pictures through the use of the a picture combining means and puts the combined picture in a combined picture storage means. Further, it transmits data, the combined picture storage means stores, through a combined picture transmission control means to a terminal, whereas the moving picture retrieving terminal side displays the received combined picture. Even in the case of simultaneously displaying a plurality of moving picture data agreeing with a retrieval condition on a screen, since the moving picture data reduced and combined in the moving picture retrieving server is received through a network and reproduced, the system resource such as a memory and a disk and the load on the network corresponding to one moving picture data can do for the simultaneous display.

A sixth aspect of this invention is that the time to be taken for the production of a combined picture is calculated to adjust the frame interval of picture data to be combined in accordance with the load on a server, with the result that, in accordance with the load on the server, unbroken moving pictures are transmittable to the moving picture retrieving terminal. Further, the moving picture retrieving server is equipped with the frame spacing setting means for setting, on the basis of the time taken for the production of a combined picture with a given number of frames, the frame spacing taken when the moving picture retrieving means derives moving picture data, and the frame spacing of the combined picture made by the reduction and combination of a plurality of moving picture data meeting the retrieval condition is changed on the basis of the frame spacing set by the frame spacing setting means, with the result that it is possible to smoothly transmit moving pictures to the moving picture retrieving terminal in accordance with the load on the server.

A seventh aspect of this invention is that in a moving picture retrieving server a combined picture transmission control means compares a frame number of a combined picture produced with a frame number of a combined picture transmitted to a moving picture retrieving terminal, and when the transmission of the combined picture reaches the combination thereof, the transmission of the produced combined picture is repeatedly done in a state where the transmission (outgoing) frame number is at the head position and the combined moving picture data is accumulated for a time taken until the transmission subsequently reaches the production, with the result that it is possible to smoothly reproduce the moving picture data on the moving picture retrieving terminal.

In addition, by repeating the reproduction in a state of making the most of the moving picture under combination, the same scene is repeatedly reproduced and the newly produced combined picture is added little by little, and therefore, finding the directing scene becomes easy.

An eighth aspect of this invention is that the time necessary for the production of a combined picture corresponding to the expected time for reproduction is calculated, and the transmission of the combined picture starts when the time necessary for the production of the remaining combined picture becomes shorter than the expected time for the reproduction. Whereupon, it is possible to start the reproduction of a plurality of moving picture data conforming with a retrieval condition after the elapse of a short waiting time without waiting for the completion of the production of combined moving picture data corresponding to the reproduction expected time.

A ninth aspect of this invention is that picture data extracted in a state of staggering the reproduction start time of arbitrarily designated moving picture data is reduced to produce combined pictures arranged and disposed with the passage of time, and the combined picture is displayed in a moving picture retrieving terminal. Thus, it is possible to more finely retrieve the selected moving picture data and further to quickly find the directing scene.

In accordance with the present invention, there is provided a picture display unit comprising: picture reducing means for reducing picture data; picture combining means for combining the reduced picture data to produce a combined picture; picture displaying means for displaying the combined picture; and simultaneous multi-scene reproducing means for taking the charge of reproduction of picture data, wherein the picture reducing means reduces the picture data in units of frames to be reproduced, the picture combining means combines the reduced picture data of the same frames of the picture data, and the simultaneous multi-scene reproducing means reproduces the combined picture.

The picture reducing means includes: macro-block forming means for dividing the picture data in units of arbitrary pixels to form macro-blocks; orthogonal conversion means for performing an orthogonal conversion of each of the macro-blocks; pixel extracting means for extracting pixels corresponding to a lowest-frequency term from the microblock undergoing the orthogonal conversion; and pixel combining means for combining the pixels extracted by the pixel extracting means.

Furthermore, in accordance with the present invention, there is provided a picture display unit comprising: picture reducing means for reducing picture data; picture combining means for combining the reduced picture data to produce a combined picture; picture displaying means for displaying the combined picture; and selected picture reproducing means for selecting and reproducing, of the combined picture, picture data to be reproduced, wherein the picture reducing means reduces the picture data free from reproduction and the picture data to be reproduced in units of frames, the picture combining means combines the reduced picture data free from reproduction and the reduced picture data to be reproduced in units of frames, and selected picture reproducing means selects and reproduces the combined picture data.

Still further, in accordance with this invention, there is provided a picture display unit comprising: key picture inputting means for inputting a key picture to be used as a retrieval key; moving picture retrieving means for retrieving moving picture data using the key picture; picture reducing means for reducing the moving picture data retrieved; picture combining means for combining the reduced picture data into a combined picture; and picture displaying means for displaying the combined picture.

The moving picture retrieving means includes: cut point detecting means for detecting cut points of the picture data to be retrieved; frame extracting means for extracting an arbitrary frame within a scene; and picture comparison decision means for comparing the extracted frame with the key picture.

The moving picture retrieving means further includes key picture registering means for newly registering as a key picture the frame which coincides with the key picture as the comparison result by the picture comparison decision means, and the picture comparison decision means again performs the comparison using the newly registered key picture. On the other hand, the moving picture retrieving means further includes key picture registering means for newly registering as a key picture the frame, most similar to the first-mentioned key picture, of all the frames within a scene including the frame which coincides with the first-mentioned key picture in the comparison result by the picture comparison decision means, and the picture comparison decision means again performs the comparison using the newly registered key picture. The moving picture retrieving means further includes picture similarity outputting means for outputting a similarity between the frame compared in the picture comparison decision means and the key picture so that the frame with the highest similarity is registered with the key picture registering means.

Moreover, in accordance with this invention, there is provided picture display system comprising a moving picture retrieving server for producing and transmitting scenes reduced and combined and a moving picture retrieving terminal for receiving and reproducing the reduced and combined scenes, with the server and the terminal being connected through a network to each other, the server including: moving picture storage means for storing moving picture data to be retrieved; picture reducing means for producing reduced pictures using the moving picture data; picture combining means for producing a combined picture using the reduced pictures; combined picture production control means for controlling the production of the combined picture; combined picture storage means for storing data on the combined picture; combined picture transmission control means for controlling the transmission of the combined picture data, stored in the combined picture storage means, to the terminal; and communication means for controlling the communication to the terminal, and the terminal including: communication means for controlling the communication to the server; and combined picture reproducing means for displaying the combined picture data produced in the server, wherein the server reduces and combines a plurality of moving picture data to produce combined picture data and transmits the produced combined picture data through the network, while the terminal receives the produced combined picture data and reproduces it as a moving picture.

In accordance with this invention, there is provided a moving picture retrieving system comprising a moving picture retrieving server for retrieving a moving picture and a moving picture retrieving terminal for giving a demand for retrieval of a moving picture to the moving picture retrieving server, with the moving picture retrieving server and the moving picture retrieving terminal being connected through a network to each other, the moving picture retrieving server including: moving picture storage means for storing moving picture data to be retrieved; moving picture retrieving means for retrieving the moving picture data stored in the moving picture storage means; picture extracting means for extracting picture data at every frame from moving picture data meeting a retrieval condition which is obtained by the retrieval of the moving picture retrieving means; picture reducing means for producing reduced pictures on the basis of the picture data extracted by the moving picture extracting means; picture combining means for producing a combined picture on the basis of the reduced pictures; combined picture production control means for controlling the production of the combined picture; combined picture storage means for storing data on the combined picture; combined picture transmission control means for controlling the transmission of the combined picture data, stored in the combined picture storage means, to the moving picture retrieving terminal; and communication means for controlling the communication with the moving picture retrieving terminal, and the moving picture retrieving terminal including: retrieval condition inputting means for inputting a retrieval condition for moving picture data; communication means for controlling the communication with the moving picture retrieving server; and combined picture reproducing means for displaying the combined picture data produced in the moving picture retrieving server, wherein the moving picture retrieving server reduces and combines a plurality of moving picture data meeting the retrieval condition to produce combined picture data and transmits the produced combined picture data through the network, while the moving picture retrieving terminal receives the combined picture data and reproduces it as a moving picture.

The moving picture retrieving server is provided with combined picture compressing means for compressing the combined picture data produced by the picture combining means and further for making the compressed picture data stored in the combined picture storage means while the moving picture retrieving terminal is equipped with combined picture extending means for extending the combined picture data received through the communication means and further for outputting the extended combined picture data to the combined picture reproducing means so that compressed data is used for the storage of the combined picture data and the communication between the moving picture retrieving server and the moving picture retrieving terminal The moving picture retrieving server is provided with frame spacing setting means for setting a frame spacing, taken when the moving picture retrieving means derives the moving picture data, on the basis of the time taken for the production of a combined picture having a given number of frames so that in the picture extracting means an extraction frame spacing for a plurality of moving picture data meeting the retrieval condition is changed on the basis of the frame spacing set by the frame spacing setting means. Further, the combined picture transmission control means includes: written frame storage means for storing a frame number of the combined picture produced by the picture combining means; transmission start control means for controlling the transmission start of the combined picture on the basis of the written frame number stored in the written frame storage means; transmission frame storage means for storing the frame number of the combined picture transmitted from the moving picture retrieving server to the moving picture retrieving terminal; frame comparing means for comparing the frame number of the produced combined picture stored in the written frame storage means with the frame number of the combined picture transmitted from the moving picture retrieving server to the moving picture retrieving terminal and stored in the transmission frame storage means to set a frame number to be transmitted next; and combined picture transmitting means for reading out the combined picture corresponding to the transmission frame number, set by the frame comparing means, from the combined picture storage means and further for outputting it to the communication means, wherein the combined picture transmission control means compares the frame number of the produced combined picture with the frame number of the combined picture transmitted to the moving picture retrieving terminal, and when the frame number of the combined picture transmitted to the moving picture retrieving terminal becomes equal or higher than the frame number of the produced combined picture, the frame number to be transmitted next is set as being the head and the reproduction of the produced combined picture is repeated.

On the other hand, the combined picture transmission control means includes: written frame storage means for storing a frame number of the combined picture produced by the picture combining means; combined picture production speed calculating means for calculating a production speed of a combined picture on the basis of the frame number stored in the written frame storage means and the time that the frame number is written; transmission start control means for controlling the transmission start on the basis of the production speed of the combined picture obtained by the combined picture production speed calculating means and a reproduction expected time; reproduction expected time storage means for storing a reproduction expected time for combined moving picture data; transmission frame storage means for storing the frame number of the combined picture transmitted from the moving picture retrieving server to the moving picture retrieving terminal; frame comparing means for comparing the frame number of the produced combined picture stored in the written frame storage means with the frame number of the combined picture transmitted from the moving picture retrieving server to the moving picture retrieving terminal and stored in the transmission frame storage means to set a frame number to be transmitted next; and combined picture transmitting means for reading out the combined picture corresponding to the transmission frame number, set by the frame comparing means, from the combined picture storage means and further for transmitting it to the communication means, wherein the written frame storage means and the combined picture production speed calculating means calculate the time necessary for the production of a combined picture corresponding to the reproduction expected time, and when the time necessary for the production of the remaining combined picture becomes shorter than the reproduction expected time, the transmission of the combined picture starts.

Still further, the moving picture retrieving terminal is provided with picture selecting means for selecting desired moving picture data from a combined moving picture produced by the reduction and combination of a plurality of moving picture data meeting the retrieval condition, while the moving picture retrieving server is equipped with scene division-number storage means for storing the number of divisions of a combined picture and time-division extracting means for extracting pictures from the moving picture storage means in a state where the reproductions times of moving picture data designated are staggered, and the moving picture retrieving server reduces the picture data obtained by dividing arbitrary moving picture data designated by the picture selecting means in units of time into the number stored in the scene division-number storage means and by extracting them, and arranges the reduced picture data in the order of time to produce the combined picture.

Moreover, in accordance with the present invention, there is provided a moving picture retrieving system comprising a moving picture retrieving server for retrieving a moving picture and a moving picture retrieving terminal for giving a demand for retrieval of a moving picture to the moving picture retrieving server, with the moving picture retrieving server and the moving picture retrieving terminal being connected through a network to each other, the moving picture retrieving server including: moving picture storage means for storing moving picture data to be retrieved; moving picture retrieving means for retrieving the moving picture data stored in the moving picture storage means; time-division extracting means for extracting pictures from the moving picture storage means in a state where the reproduction start times of a plurality of designated moving picture data are staggered; picture reducing means for producing reduced pictures on the basis of the picture data extracted by the moving picture extracting means; picture combining means for producing a combined picture on the basis of the reduced pictures; combined picture production control means for controlling the production of the combined picture; combined picture storage means for storing data on the combined picture; combined picture transmission control means for controlling the transmission of the combined picture data, stored in the combined picture storage means, to the moving picture retrieving terminal; and communication means for controlling the communication with the moving picture retrieving terminal, and the moving picture retrieving terminal including: retrieval condition inputting means for inputting a retrieval condition for moving picture data; communication means for controlling the communication with the moving picture retrieving server; and combined picture reproducing means for displaying the combined picture data produced in the moving picture retrieving server, wherein the time-division extracting means extracts the moving picture data stored in the moving picture storage means, while the picture combining means arranges, in the order of time, the reduced moving picture data meeting the retrieval condition and the reduce picture data extracted in a state where the reproduction start times of the moving picture data meeting the retrieval condition are staggered, thereby producing the combined picture.

BRIEF DESCRIPTION OF THE DRAWINGS

The object and features of the present invention will become more readily apparent from the following detailed description of the preferred embodiments taken in conjunction with the accompanying drawings in which:

FIG. 30 is an illustration of one example of dispositions of reduced pictures in the twelfth embodiment of this invention;

DETAILED DESCRIPTION OF THE INVENTION

Referring now to FIGS. 1 to 32, a description will be made hereinbelow of embodiments of the present invention.
(First Embodiment)

Figure 1:
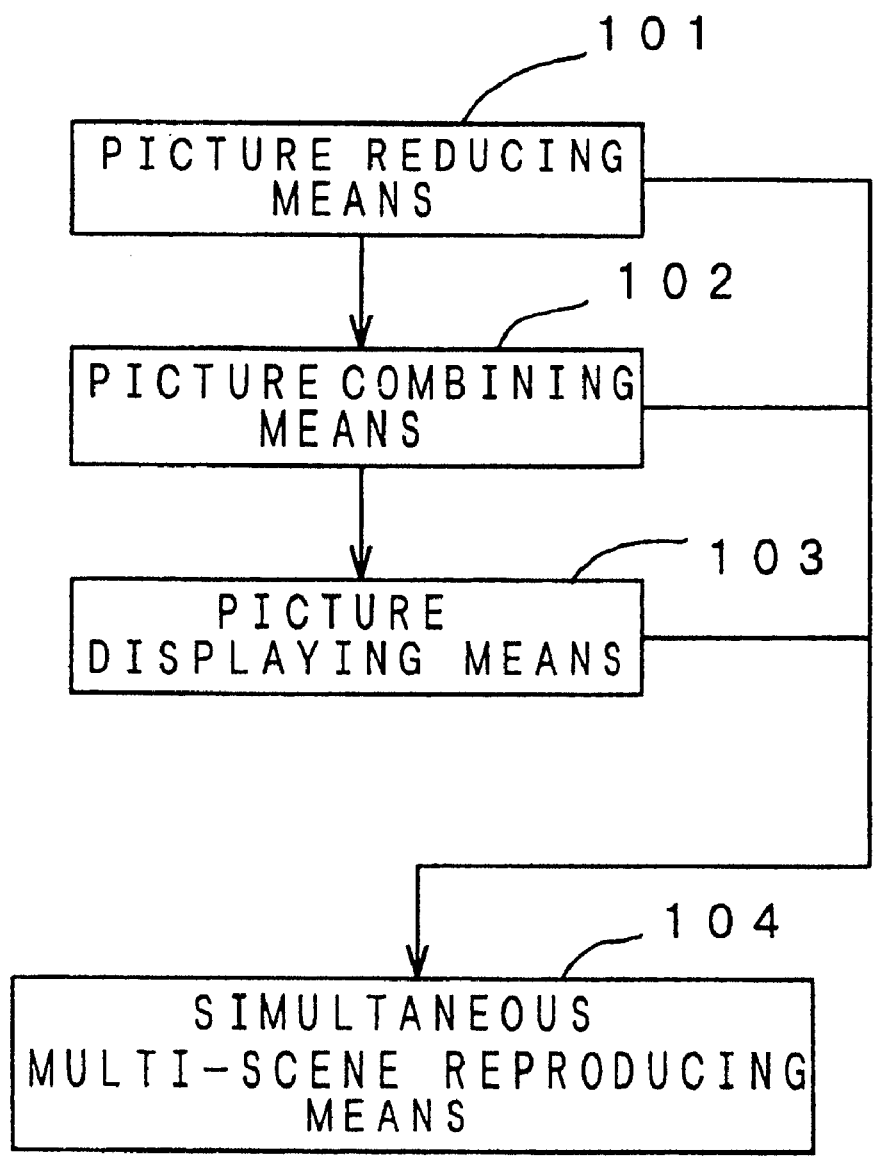
FIG. 1 is an illustration of an arrangement of a picture display unit according to a first embodiment of the present invention.

FIG. 1 is an illustration of one example of arrangements of a picture display unit according to a first embodiment of the present invention. In FIG. 1, reference numeral 101 represents a picture reducing means for reducing picture data, numeral 102 designates a picture combining means for combining pictures reduced by the picture reducing means 101, numeral 103 denotes a picture displaying means for displaying the picture combined by the picture combining means 102, numeral 104 depicts a simultaneous multi-scene reproducing means for simultaneously reproducing the pictures obtained in a manner that all the pictures combined by the picture combining means 102 and displayed by the picture displaying means 103 are reduced in units of frames in the picture reducing means 101 and combined in terms of each frame in the picture combining means 102.

Figure 2A:
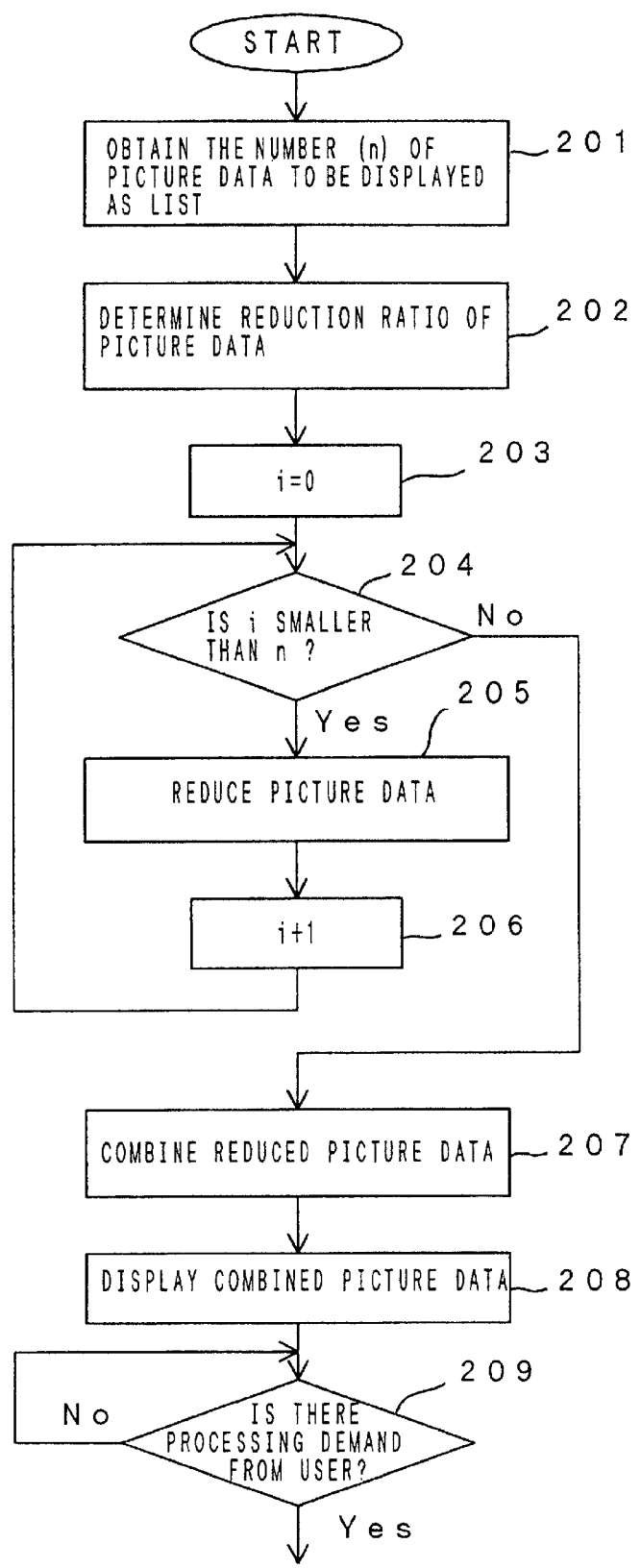
FIG. 2A is a flow chart showing process taken till display of picture data according to this invention.
Figure 2B:
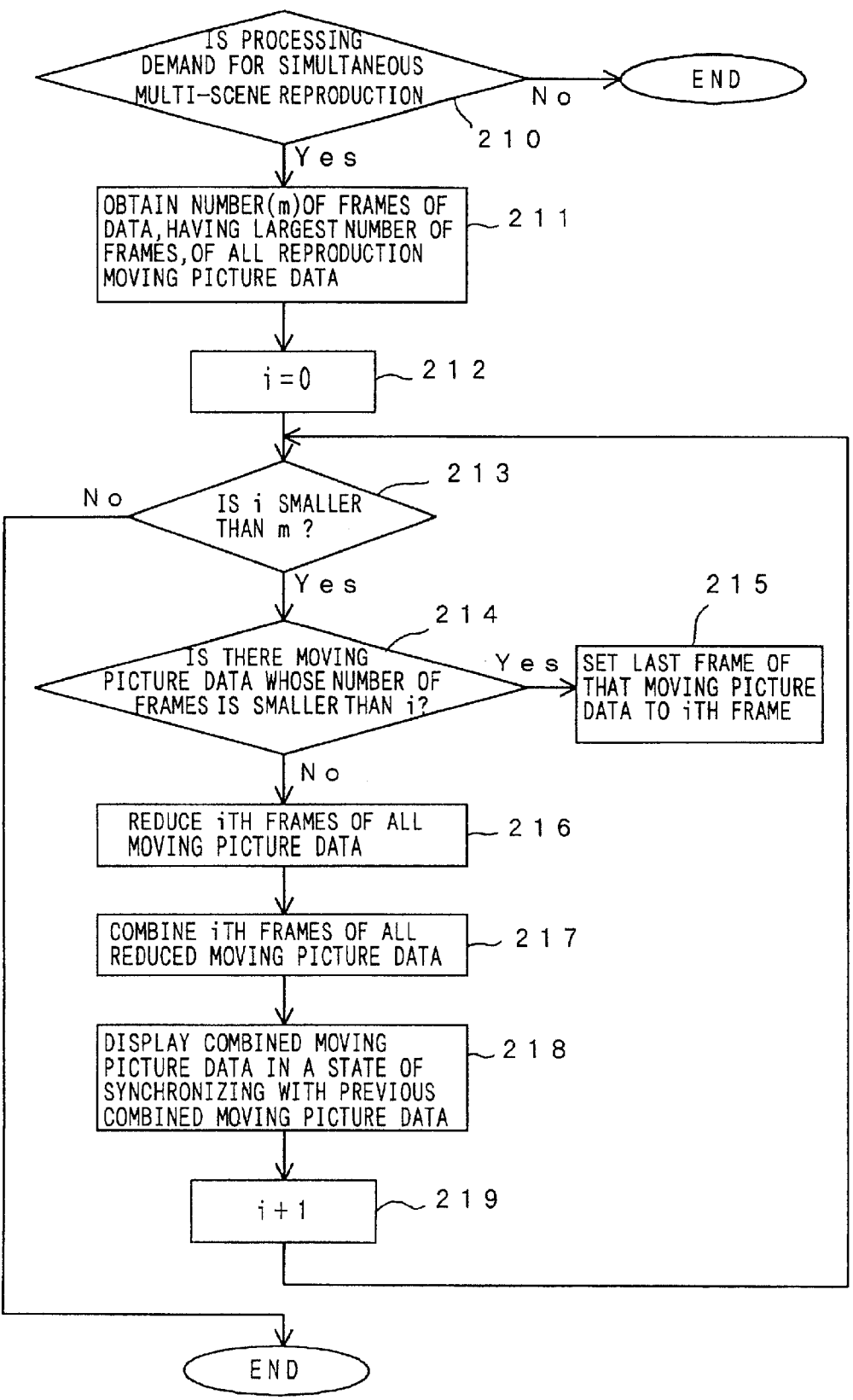
FIG. 2B is a flow chart showing simultaneous multi-scene reproduction processing according to the first embodiment of this invention.

FIGS. 2A and 2B are flow charts showing an operation to be conducted in the picture display unit according to this embodiment. A description will be taken hereinbelow of the operation with reference to the flow charts of FIGS. 2A and 2B in addition to FIG. 1. In FIGS. 2A and 2B, the operation starts with a step 201 to obtain the number of picture data to be displayed as a list, then followed by a step 202 in which a reduction ratio is calculated on the basis of the obtained number of picture data. Further, in a step 203 the number (i) of start steps is set to 0, while in a step 205 the picture reducing means 101 reduces the picture data at the reduction ratio calculated in the step 202 until the start step number (i) becomes equal to the number of picture data to be displayed as a list (step 204), and after each reduction, in a step 206 the start step number (i) is incremented by one. The "start" of the start steps signifies the start of the orthogonal conversion at every macro-block while the "steps" thereof means the steps for the orthogonal conversion of the divided macro-block. When the start step number (i) reaches the number of picture data to be displayed as a list (step 204), in a step 207 the picture combining means 102 combines all the picture data reduced and in a step 208 the picture displaying means 103 displays the picture combined in the picture combining means 102.

In the case of receiving a demand or request for reproduction of all moving picture data corresponding to the combined picture from the user (steps 209 and 210), the operation advances to a step 211 to obtain the number (m) of frames of the moving picture data, whose number of frames is the largest, of all the moving picture data undergoing the reproduction, then followed by a step 212 to set the start step number (i) to 0, and further, until the start step number (i) becomes equal to the number (m) of frames of the moving picture data which is the largest in frame number (step 213), a step 214 is executed to examine whether or not, of all the moving picture data, there is moving picture data whose number of frames does not reach the start step number (i). If present (the answer of the step 214 is affirmative), the operation proceeds to a step 215 to set the last frame of the moving picture data, whose frame number does not reach the start step number (i), as the ith frame (i: the number of start steps). After this, in a step 216 the picture reducing means 101 reduces the ith frames of all the moving picture data at the reduction ratio calculated in the step 202, and in a step 217 the picture combining means 102 combines the pictures of the ith frames of all the reduced moving picture data, while in a step 218 the picture displaying means 103 displays the aforesaid combined picture in a state of synchronizing with the combined picture of the i−1th frame, subsequently followed by a step 219 to increment the start step number (i) by one.

Thereafter, the operational flow returns to the step 213, the same processing is repeatedly conducted until i=m. On the other hand, if the decision of the step 210 is "NO", this operation comes to an end.

As described above, according to this embodiment, in the case of simultaneously reproducing all the pictures reduced, combined and displayed, even if the pictures differ in the number of frames from each other, in terms of the pictures having a small number of frames, after the reproduction of its last frame, the same last frame is repeatedly reproduced so that the simultaneous multi-scene reproduction can be handled as the reproduction of one moving picture data. Accordingly, it is possible to eliminate the troublesome control such as the decoding corresponding to the number of moving pictures to be reproduced on the reproduction side. In addition, in the case of transferring the combined picture through a network or in other cases, in reproducing a plurality of moving picture data through the network, the number of streams is reducible, and the consumption of the system resource is suppressible in the same terminal, which allows the effective utilization of the system resource, thus providing great practical effects.

(Second Embodiment)

Figure 3:
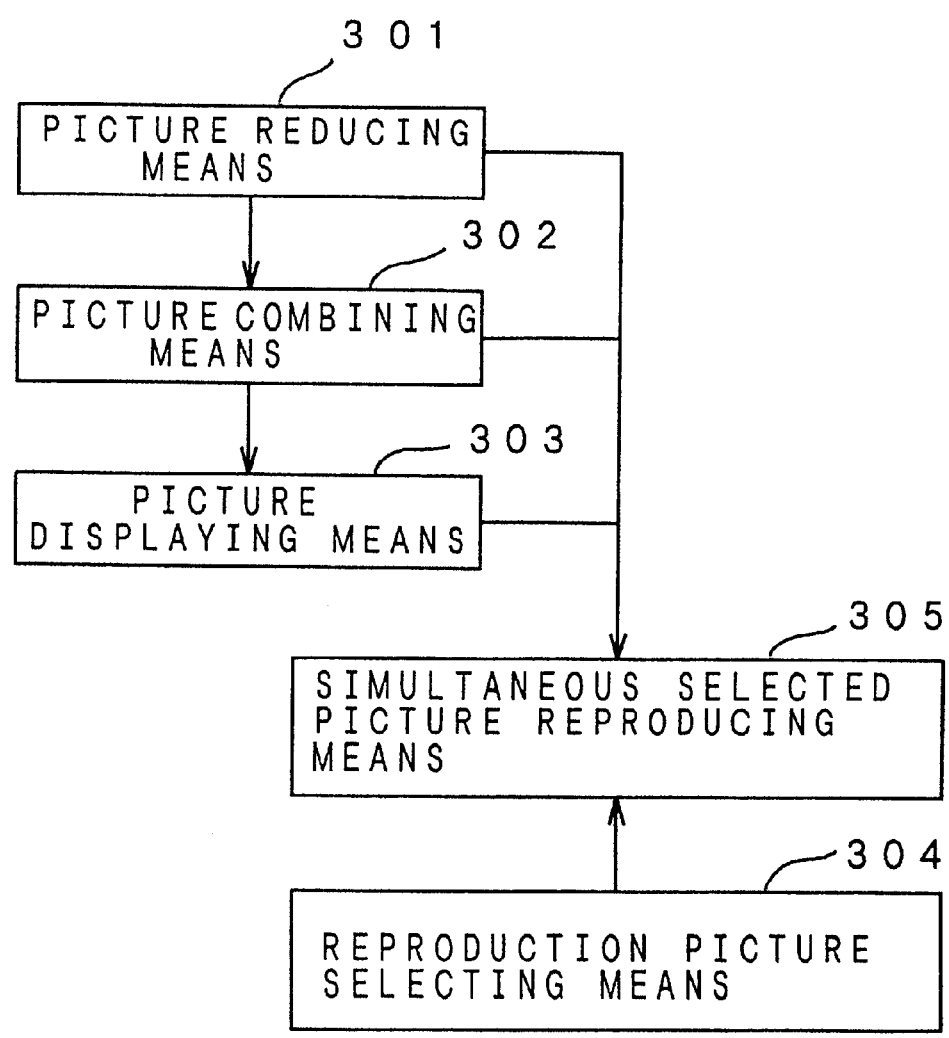
FIG. 3 is an illustration of an arrangement of a picture display unit according to a second embodiment of the present invention.

FIG. 3 is an illustration of one example of arrangements of a picture display unit according to a second embodiment of the present invention. In FIG. 3, numeral 301 signifies a picture reducing means for reducing picture data, numeral 302 stands for a picture combining means for combining the pictures reduced by the picture reducing means 301, numeral 303 depicts a picture displaying means for displaying the picture combined by the picture combining means 302, numeral 304 denotes a reproduction picture selecting means for selecting the pictures to be reproduced from the pictures displayed by the picture displaying means 303, and numeral 305 indicates a simultaneous selected picture reproducing means for simultaneously reproducing the pictures designated by the reproduction picture selecting means 304.

Figure 4:
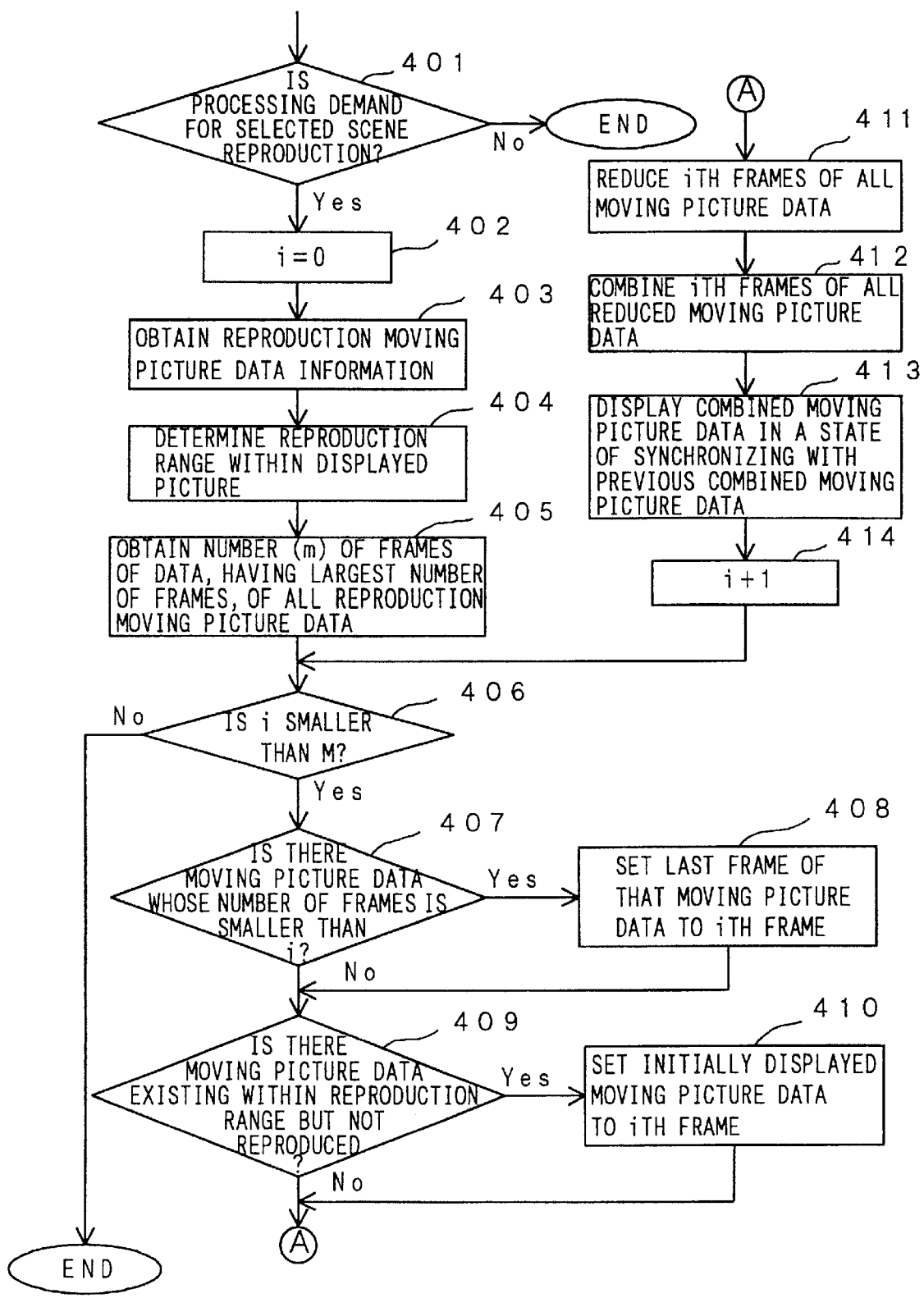
FIG. 4 is a flow chart showing selected picture reproduction processing according to a second embodiment of this invention.

FIG. 4 is a flow chart showing an operation to be conducted in the simultaneous selected picture reproducing means 305. This operation will be described hereinbelow referring to the FIG. 4 flow chart in addition to FIG. 3 and FIG. 2A flow chart. As in the case of the above-described first embodiment, a portion of the operation is done as shown in the flow chart of FIG. 2A. In FIGS. 2A and 4, in cases where a user demand is a selected scene reproduction demand (steps 209, 401), in a step 402 the number (i) of start steps is set to 0, and subsequently, a step 403 is executed to obtain information indicative of the moving picture data, to be reproduced, of the corresponding moving picture data, the user selects, within the aforesaid combined picture, then followed by a step 404 to determine the reproduction range having a rectangular configuration on the basis of the information obtained in the step 403. Further, a step 405 follows to acquire the number (m) of frames of the moving picture data having the largest frame number of the moving data to be reproduced. The, until the start step number (i) becomes equal to the number (m) of frames of the moving picture data having the largest frame number (step 406), in a step 407 a check is made in terms of whether or not there is, of the reproduction moving picture data, the moving picture data whose frame number does not reach the start step number (i). If present (the affirmative decision), a step 408 follows to set the last frame of the moving picture data of the frame number smaller than the start step number (i) as the ith frame (i: the number of start steps). Subsequently, a step 409 is performed to check whether or not there is moving picture data existing within the reproduction range but not reproduced. If present (the decision "YES"), in a step 410, in the moving picture data free from reproduction, the data (frame number) on the frame initially displayed is set to the number (i) of start steps, and in a step 411 the picture reducing means 301 reduces the ith frames of all the moving picture data at the reduction ratio calculated in the step 202, while in a step 412 the picture combining means 302 combines the ith frame pictures of all the moving picture data reduced, and further, in a step 413 the picture displaying means 303 displays the combined picture in a state of synchronizing with the i−1th frame combined picture. Following this, the start step number (i) is incremented by one in a step 414, and when the start step number (i) reaches the number (m) of frames of the moving picture data which is the largest in number of frames (step 406), this operation comes to termination. This operation also comes to an end when the answer of the step 410 shows "NO".

As described above, according to this embodiment, in the case that, of all the pictures reduced, combined and displayed, the pictures are selected including the pictures to be simultaneously reproduced so that the selected pictures forms a rectangular configuration and reproduced, in terms of the pictures other than the selected pictures, their first frames are repeatedly reproduced, and in a similar way, in terms of the pictures whose number of frames is small among the selected pictures, their last frames are also repeatedly reproduced even after their reproduction, that is, in addition to all the pictures reduced, combined and displayed, the selection of a portion thereof is possible, and therefore, in addition to the effects, it is possible to further reduce the useless data quantity, which can provide great practical effects.

(Third Embodiment)

Figure 5:
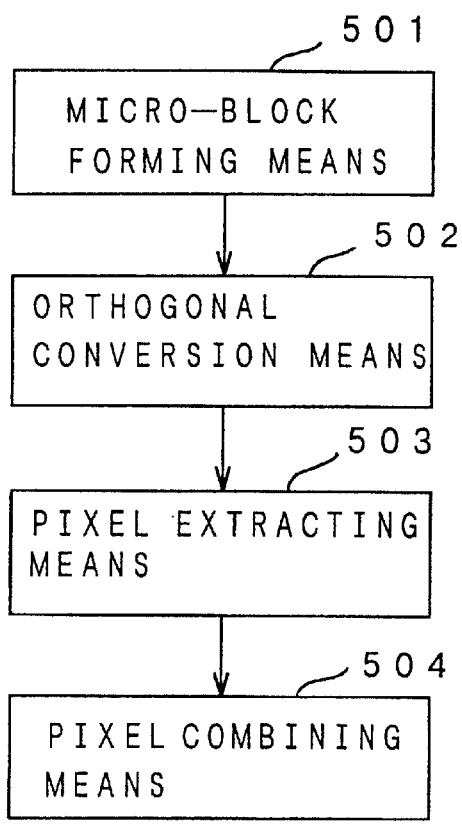
FIG. 5 is an illustration of a picture reducing means according to a third embodiment of this invention.

FIG. 5 is an illustration of one example of internal arrangements of the picture reducing means 101 in the embodiment. In FIG. 5, numeral 501 represents a macro-block forming means for dividing picture data in units of arbitrary pixels, numeral 502 signifies an orthogonal conversion means for performing an orthogonal conversion of each of the macro-blocks formed by the macro-block forming means 501, numeral 503 denotes a pixel extracting means for extracting a first low-frequency (lowest frequency) term, and numeral 504 depicts a pixel combining means for combining the pixels extracted by the pixel extracting means 503.

Figure 6:
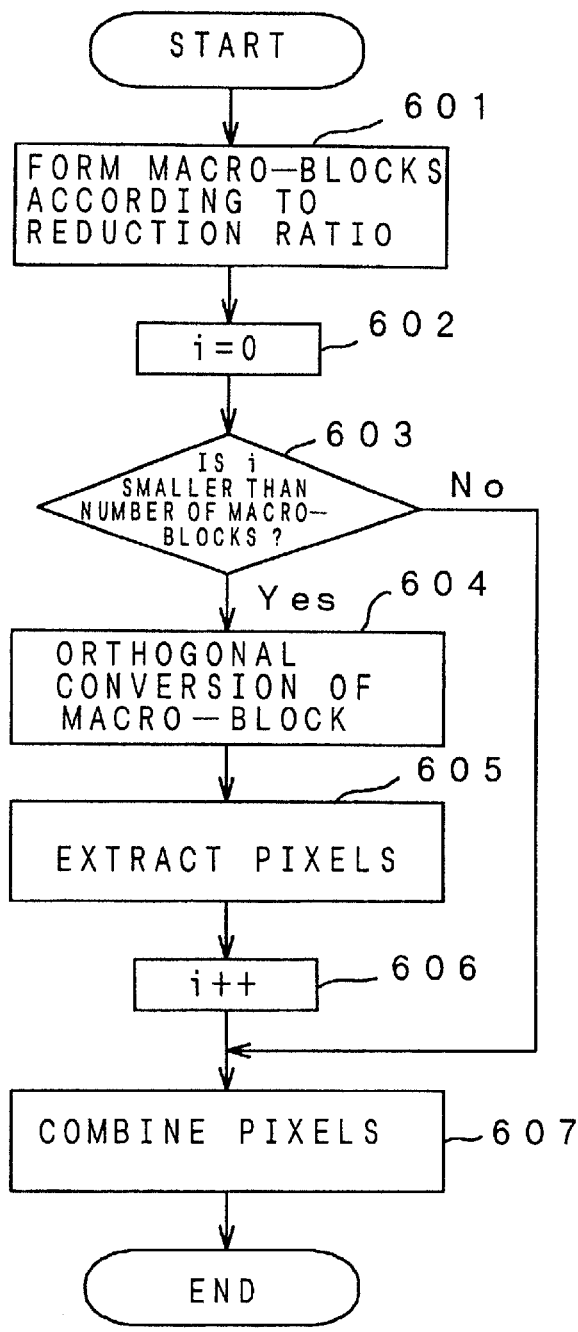
FIG. 6 is a flow chart showing an operation to be conducted by the picture reducing means according to the third embodiment of this invention.

FIG. 6 is a flow chart showing an operation to be conducted in the picture reducing means 101 according to the third embodiment. The operation will be described hereinbelow with reference to FIG. 6 in addition to FIG. 5. In FIG. 6, in a step 601 the micro-block forming means 501 divides picture data into macro-blocks in accordance with a reduction rate, then followed by a step 602 to set the number (i) of start steps to 0. If the start step number (i) is smaller than the number of macro-blocks due to the division in the step 601 (step 603), a step 604 follows so that the orthogonal conversion means 502 performs the orthogonal conversion of the macro-blocks, and a step 605 is executed so that the pixel extracting means 503 extracts the pixel of the first low-frequency term after the orthogonal conversion in the step 604. After this, a step 606 is executed to increment the start step number (i) by one. When the start step number (i) becomes equal to the number of macro-blocks due to the division in the step 601 (step 603), in a step 607 the picture combining means 504 combines the extracted pixels to produce a reduced picture.

As described above, according to this embodiment, a reduced picture can arbitrarily be produced by varying the division number of macro-blocks, with the result that it is possible to easily produce arbitrary reduced pictures, which can provide great practical effects.

(Fourth Embodiment)

Figure 7:
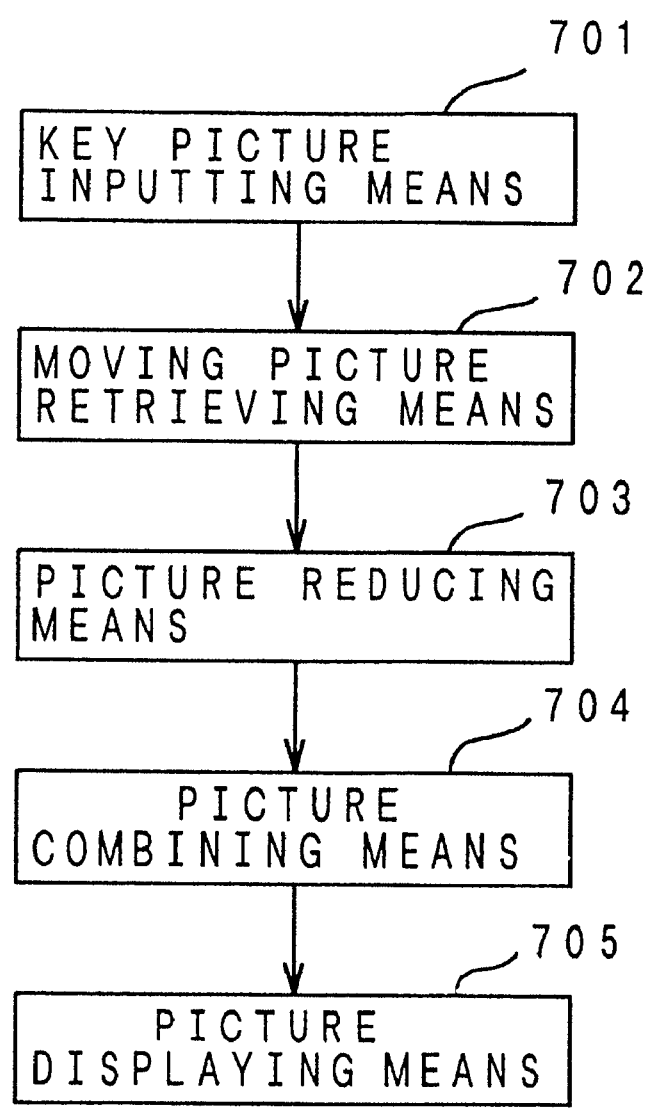
FIG. 7 is an illustration of a picture display unit according to a fourth embodiment of this invention.

FIG. 7 is an illustration of one example of arrangements of a picture display unit according to a fourth embodiment of the present invention. In FIG. 7, numeral 701 represents a key picture inputting means for inputting a key picture for the retrieval of a moving picture, numeral 702 designates a moving picture retrieving means for retrieving moving picture data by the comparison with the key picture, numeral 703 denotes a picture reducing means for reducing the picture data being the retrieval result, numeral 704 depicts a picture combining means for combining the pictures reduced by the picture reducing means 703, and numeral 705 signifies a picture displaying means for displaying the picture combined by the picture combining means 704.

Figure 8:
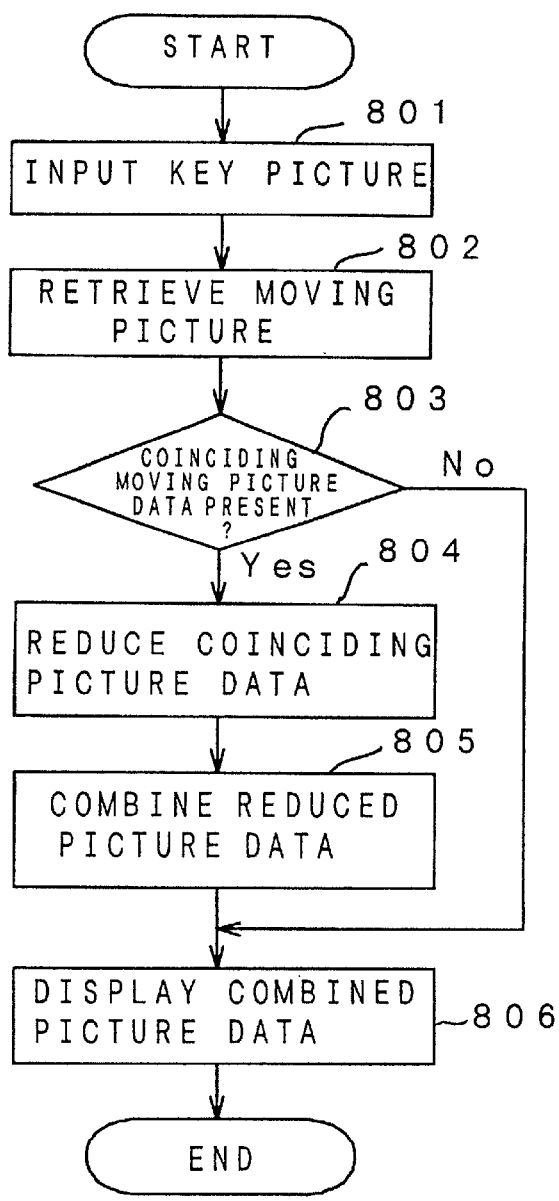
FIG. 8 is a flow chart showing an operation to be conducted in the fourth embodiment of this invention.

FIG. 8 is a flow chart showing an operation to be conducted in the picture display unit according to the fourth embodiment. A description will be made hereinbelow of the operation with reference to FIG. 8 in addition to FIG. 7. In FIG. 8, in a step 801 the input of the key picture serving as a retrieval condition is carried out through the key picture inputting means 701, and in a step 802 the moving picture retrieving means 702 retrieves moving picture data on the basis of the inputted key picture. When the decision of the step 802 shows the presence of a moving picture coinciding with the key picture (step 803), in a step 804 the picture reducing means 703 reduces the representative frame of the moving picture data coinciding therewith. Further, in a step 805 the picture combining means 704 all the reduced representative frames, and in a step 806 the picture displaying means 705 displays the picture combined by the picture combining means 704.

As described above, according to this embodiment, since the retrieval result is displayed as a data list of still pictures, it is possible to easily narrow down the retrieval result, which can provide great practical effects.

(Fifth Embodiment)

Figure 9:
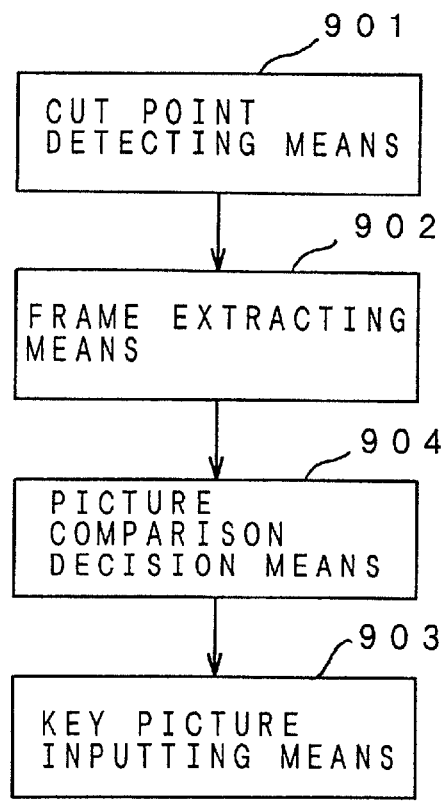
FIG. 9 shows an arrangement of a moving picture retrieving means in a fifth embodiment of this invention.

FIG. 9 is an illustration of one example of internal arrangements of the moving picture retrieving means 702 in the above-described fourth embodiment. In FIG. 9, numeral 901 stands for a cut point detecting means for detecting cut points being turning points or change between the scenes from moving picture data, numeral 902 signifies a frame extracting means for extracting the representative frame of each of the scenes within the moving picture data, numeral 903 depicts a key picture inputting means for inputting a key picture serving as a retrieval condition, and numeral 904 indicates a picture comparison decision means for comparing the key picture with the representative frame of each of the moving picture data to output the coinciding representative frame of the moving picture data.

Figure 10:
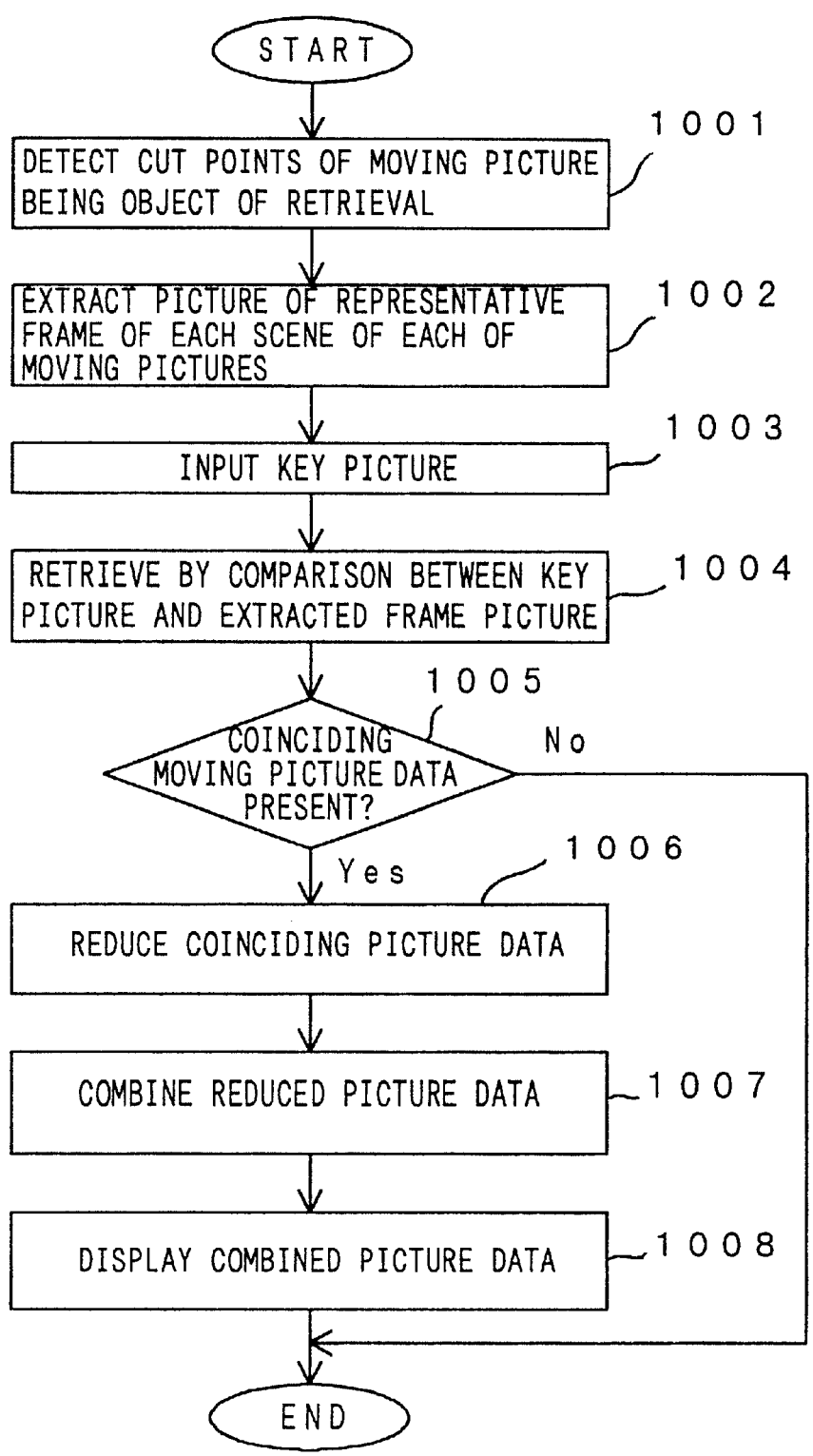
FIG. 10 is a flow chart showing an operation to be conducted by the FIG. 9 moving picture retrieving means.

FIG. 10 is a flow chart showing an operation to be conducted in the moving picture retrieving means 702 in FIG. 7. The operation will be described hereinbelow with reference to FIG. 10 in addition to FIGS. 8 and 9. In FIG. 10, in a step 1001 the cut point detecting means 901 detects the cut points of the moving picture data being the object of the retrieval, and in a step 1002 the frame extracting means 902 extracts the representative frame of the scene calculated or obtained on the basis of the two consecutive cut points. Further, in a step 1003 the key picture inputting means 903 performs the input of a key picture, whereupon the retrieval of the representative frame extracted by the frame extracting means 902 is made on the basis of the key picture inputted in the step 1003. The following steps are executed as well as the step 803 and the steps subsequent thereto in FIG. 8.

As described above, according to this embodiment, since the comparison of the key picture with the representative frame of each of the scenes of the moving picture data can eliminate the need for the comparison of the key picture with all the frames of the moving picture data, the retrieval processing speed can increase, which can provide great practical effects.

(Sixth Embodiment)

Figure 11:
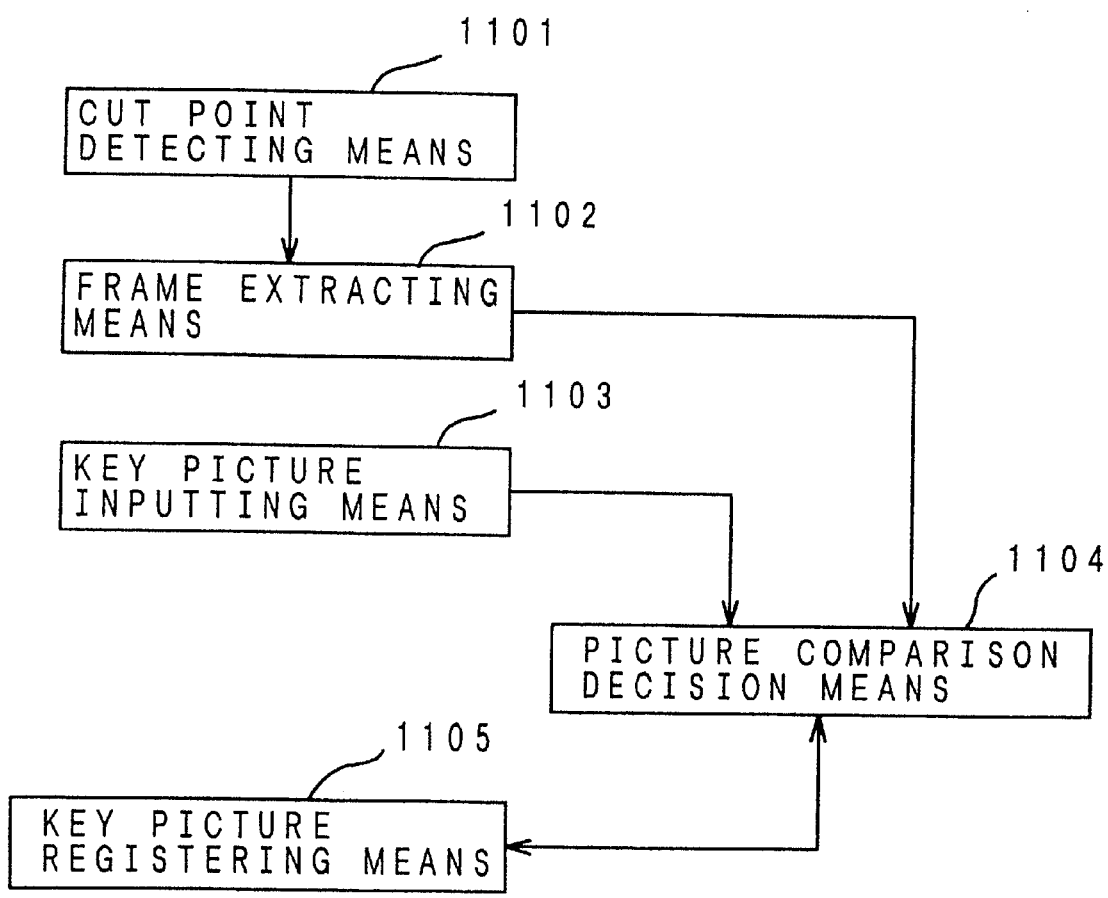
FIG. 11 shows an arrangement of a moving picture retrieving means according to a sixth embodiment of this invention.

FIG. 11 is an illustration of another example of internal arrangements of the moving picture retrieving means 702 according to a sixth embodiment of the present invention. In FIG. 11, the moving picture retrieving means 702 is composed of a cut point detecting means 1101 for detecting cut points being the change of the scene from moving picture data, a frame extracting means 1102 for extracting the representative frame of each of the scenes within the moving picture data, a key picture inputting means 1103 for inputting a key picture serving as a retrieval condition, a picture comparison decision means 1104 for comparing the key picture with the representative frame of each of the scenes of each of the moving picture data to output the representative frame of the moving picture data coinciding with the key picture, and a key picture registering means 1105 for registering the coinciding frame in the comparison as a key picture.

Figure 12:
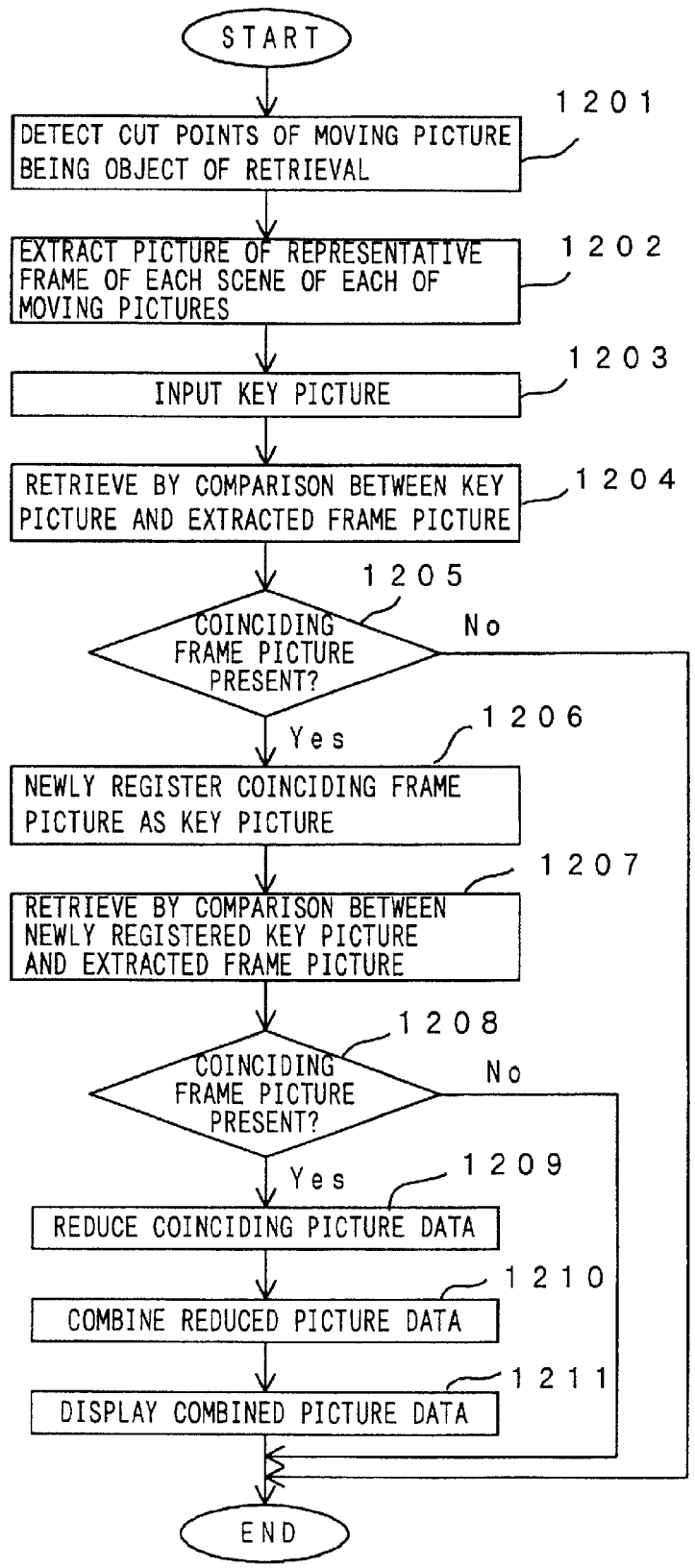
FIG. 12 is a flow chart showing an operation to be conducted by the FIG. 11 moving picture retrieving means.

FIG. 12 is a flow chart showing an operation to be conducted in the moving picture retrieving means 702 in FIG. 7. The operation will be described hereinbelow with reference to FIG. 12 in addition to FIGS. 11 and 8. In FIG. 12, in a step 1201 the cut point detecting means 1101 detects the cut points of the moving picture data being the object of the retrieval, and in a step 1202 the frame extracting means 1102 extracts the representative frame of the scene defined on the basis of the two consecutive cut points, and further, in a step 1203 a key picture is inputted through the key picture inputting means 1103. Further, in a step 1204 the retrieval of the representative frame of each scene of the moving picture extracted by the frame extracting means 1102 is made on the basis of the key picture inputted in the step 1203. If the coinciding representative frame is present (step 1205), in a step 1206 the key picture registering means 105 registers all the representative frames coinciding with the key picture as key pictures, so that in a step 1207 the representative frames are again retrieved with the newly registered key picture. The following steps are the same as the step 803 and the steps subsequent thereto in FIG. 8.

As described above, according to this embodiment, since the key picture registering means is additionally provided to register the coinciding frames as key pictures, the number of pictures serving as the retrieval keys increases, thus preventing the retrieval omission. This can provide great practical effects.

(Seventh Embodiment)

Figure 13:
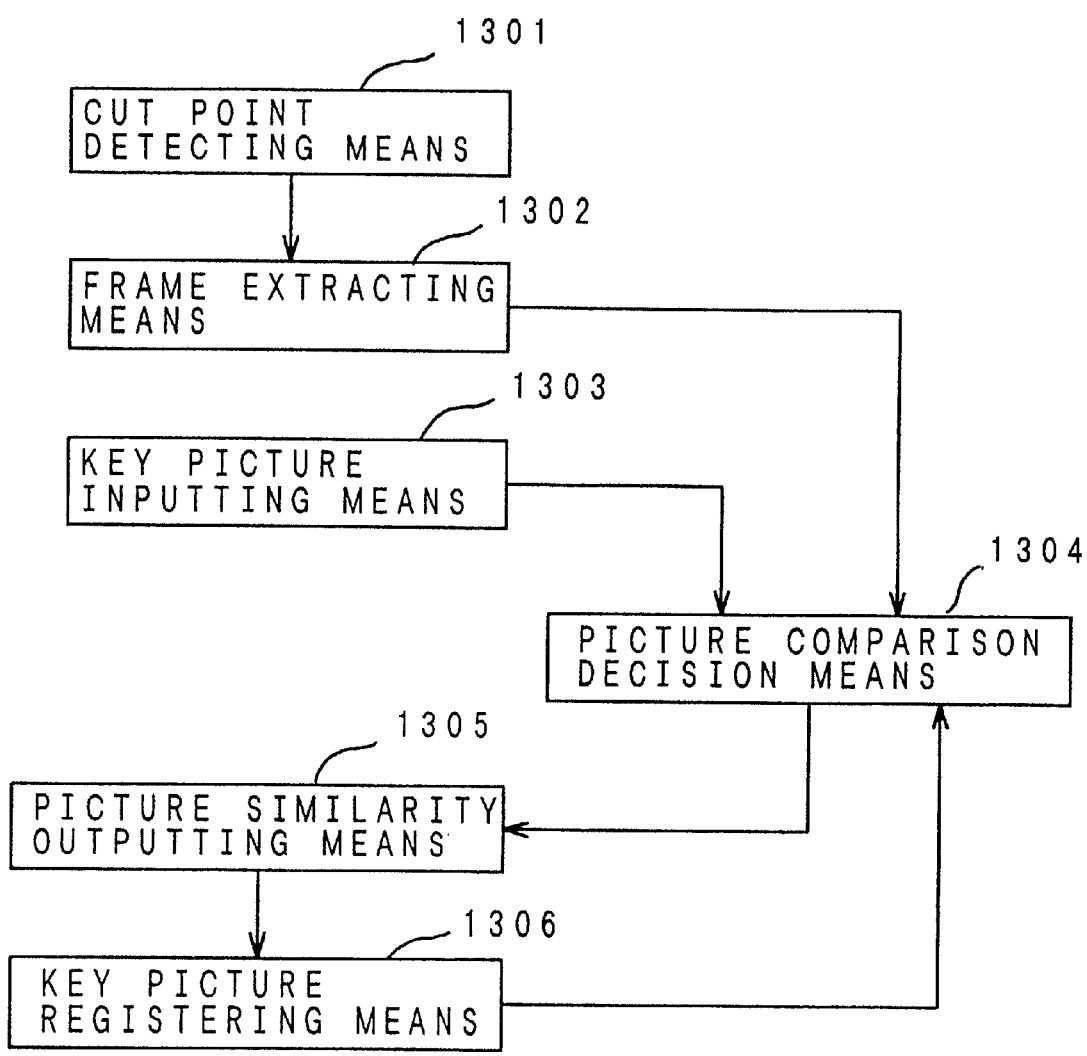
FIG. 13 illustrates an arrangement of a moving picture retrieving means according to a seventh embodiment of this invention.

FIG. 13 is a further example of the internal arrangements of the picture retrieving means in the sixth embodiment. In FIG. 13, the picture retrieving means is made up of a cut point detecting means 1301 for detecting cut points being the change of the scene from moving picture data, a frame extracting means 1302 for extracting the representative frame of each of the scenes within the moving picture data, a key picture inputting means 1303 for inputting a key picture serving as a retrieval condition, a picture comparison decision means 1304 for comparing the key picture with the representative frame of each moving picture data to output the moving picture data coinciding with the key picture, a picture similarity outputting means 1305 for selecting the frame most similar to the key picture from all the frames of scene including the coinciding frame from the picture comparison decision means 1304 and for outputting the most similar frame, and a key picture registering means 1306 for registering as a key picture the most similar frame outputted from the picture similarity outputting means 1305.

Figure 14:
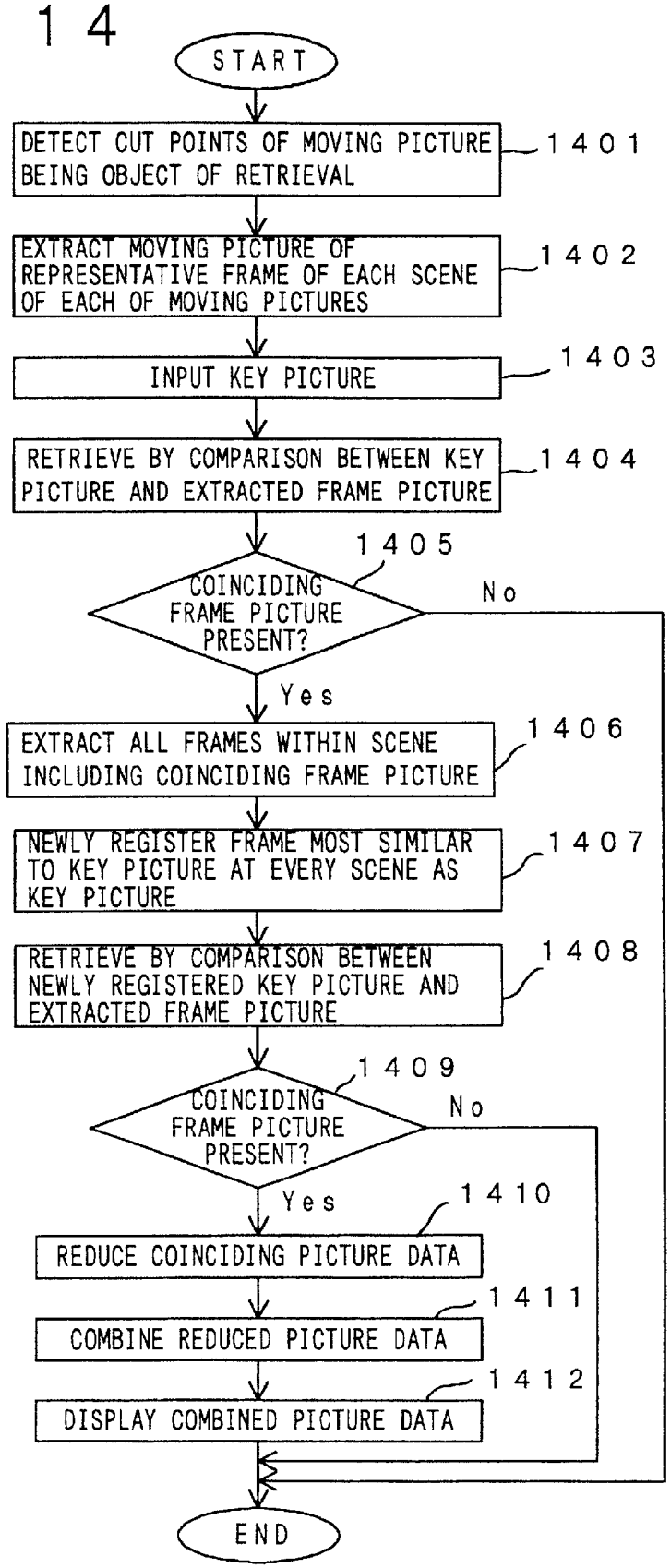
FIG. 14 is a flow chart showing an operation by the FIG. 13 moving picture retrieving means.

FIG. 14 is a flow chart showing an operation to be conducted in the moving picture retrieving means according to the seventh embodiment. The operation will be described hereinbelow with reference to FIG. 14 in addition to FIGS. 13 and 8. In FIG. 14, in a step 1401 the cut point detecting means 1301 detects the cut points of the moving picture data being the object of the retrieval, and in a step 1402 the frame extracting means 1302 extracts the representative frame of the scene calculated on the basis of the two consecutive cut points. Further, in a step 1403 a key picture is inputted through the key picture inputting means 1303, and in a step 1404 a retrieval of the representative frames extracted by the frame extracting means 1302 is made on the basis of the key picture inputted in the step 1403. If the coinciding representative frame is present (step 1405), in a step 1406 the frame extracting means 1302 extracts all the frames of the scene including the coinciding representative frame, and further, in a step 1407 the picture similarity outputting means 1305 compares the key picture with all the extracted frames and the key picture registering means 1306 registers the frame with the highest similarity as a key picture. Accordingly, in a step 1408 the representative frames are again retrieved using the newly registered key picture. The following steps are executed as well as the step 803 and the steps subsequent thereto in FIG. 8.

As described above, according to this embodiment, since the picture similarity outputting means is further provided to output the frame, most similar to the key picture, of all the frames of the scene including the coinciding frame selected by the picture comparison decision means, the picture used as a new retrieval key becomes more similar to the initial key picture, which improves the accuracy of the retrieval result. Accordingly, this can provide great practical effects.

(Eighth Embodiment)

Figure 15:
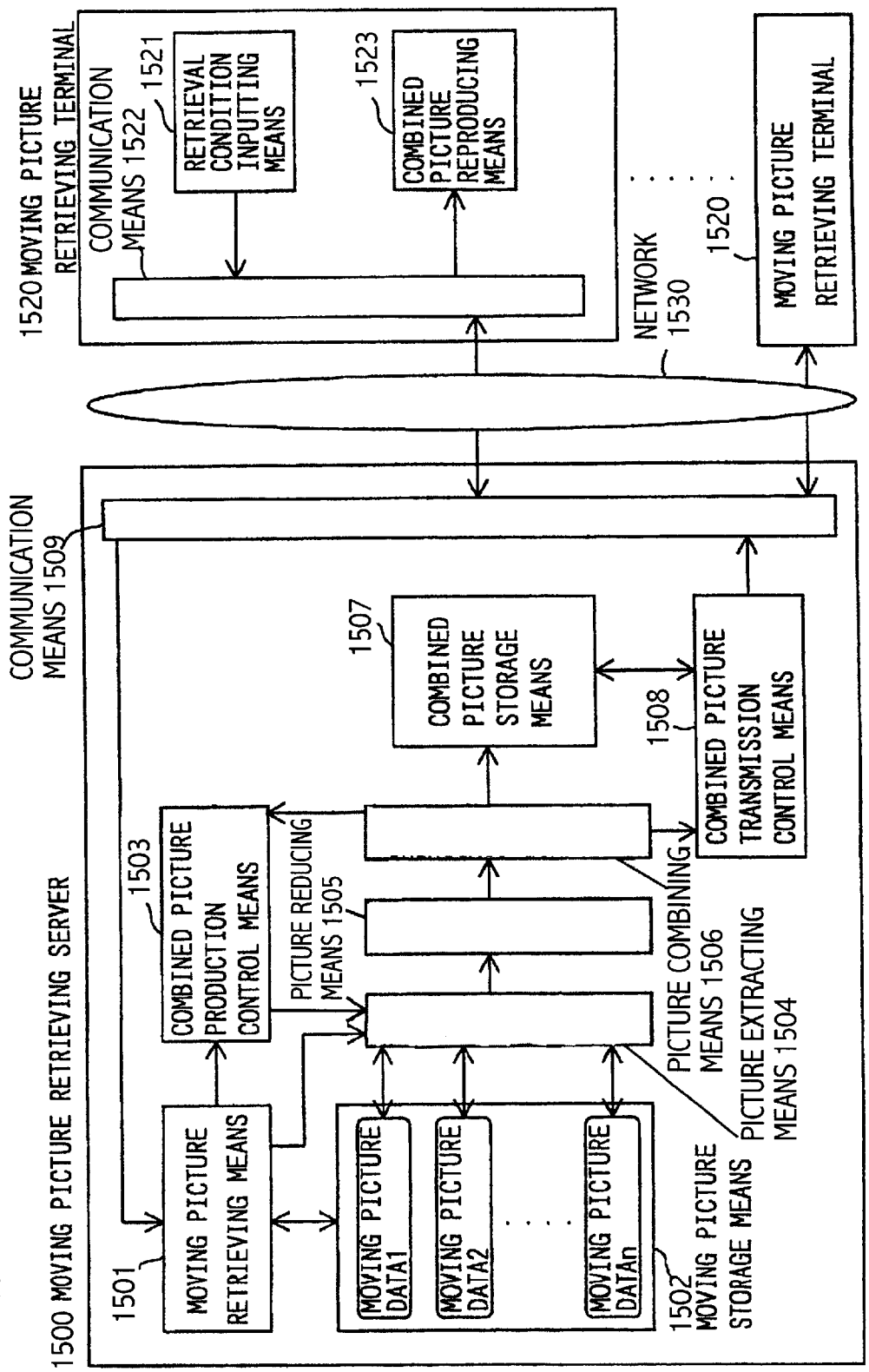
FIG. 15 illustrates an arrangement of a moving picture retrieving system according to an eighth embodiment of this invention.

FIG. 15 is an illustration of one example of arrangements of a moving picture retrieving system according to an eighth embodiment of the present invention, where a moving picture retrieving server 1500 and a moving picture retrieving terminal 1520 is connected to each other through a network 1530.

The moving picture retrieving server 1500 comprises a moving picture retrieving means 1501 for retrieving moving picture data meeting a retrieval condition, a moving picture storage means 1502 for storing moving picture data being the object of the retrieval, a combined picture production control means 1503 for controlling a series of processing for the production of a combined picture, a picture extracting means 1504 for deriving a picture at every frame from the moving picture data meeting the retrieval condition obtained in the moving picture retrieving means 1501, a picture reducing means 1505 for reducing moving picture data, a picture combining means 1506 for regularly disposing the reduced pictures to combine them into one scene, a combined picture storage means 1507 for storing a combined picture, a combined picture transmission control means 1508 for outputting information about the produced combined picture such as a frame number and an identifier for a terminal issuing a retrieval demand, and a communication means 1509 for controlling the communication with a terminal.

On the other hand, the moving picture retrieving terminal 1520 is composed of a retrieval condition inputting means 1521 for inputting a retrieval condition such as a key word, a communication means 1522 for controlling the communication with the moving picture retrieving server 1500, and a combined picture reproducing means 1523 for displaying combined picture data being the retrieval result.

Figure 16:
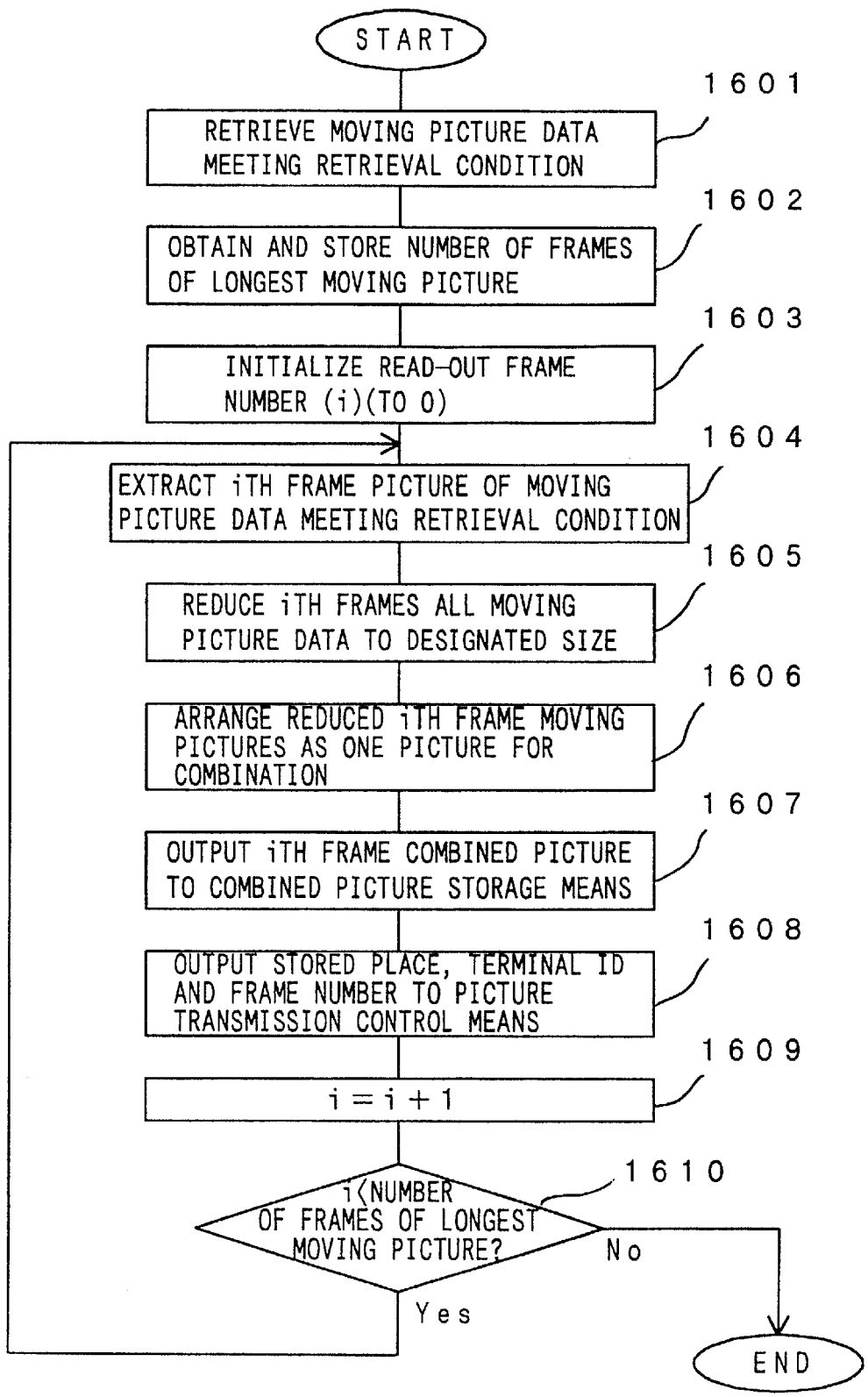
FIG. 16 is a flow chart showing multi-moving picture combining processing by a moving picture retrieving server in the eighth embodiment of this invention.

FIG. 16 is a flow chart showing multi-moving picture combination processing in the moving picture retrieving server 1500 of the moving picture retrieving system according to this embodiment. The operation thereof will be described hereinbelow with reference to FIG. 16 in addition to FIG. 15.

First, the moving picture retrieving means 1501 retrieves moving picture data meeting a retrieval condition from among moving picture data stored in the moving picture storage means 1502 (step 1601), and obtains the number of frames of the data, taking the longest time, of the moving picture data agreeing with the retrieval condition and outputs it to the combined picture production control means 1503 (step 1602), and further initializes a read-out frame number (i) to 0 and outputs an identifier for the moving picture data meeting the retrieval condition and information indicative of the start of the production of a combined picture to picture extracting means 1504 (step 1603).

Secondly, the picture extracting means 1504 extracts the picture of the ith frame (i: the read-out frame number) from each of the moving picture data meeting the retrieval condition which are obtained in the moving picture retrieving means 1501 (step 1604).

Subsequently, the picture reducing means 1505 reduces the ith frame picture data of the moving picture data extracted in the picture extracting means 1504 at an arbitrary reduction ratio set in advance (step 1605). In terms of this reduction ratio, for example, each side is reduced to ¼ in the case that the combination is made in 4 in length ×4 in width. Although, for the illustration only, the reduction ratio is set to ¼, even if the data is reduced in the vertical and horizontal directions at an arbitrary reduction ratio in accordance with the number of moving picture data to be simultaneously displayed, it is obvious that this does not have influence on the other operations.

Figure 17:
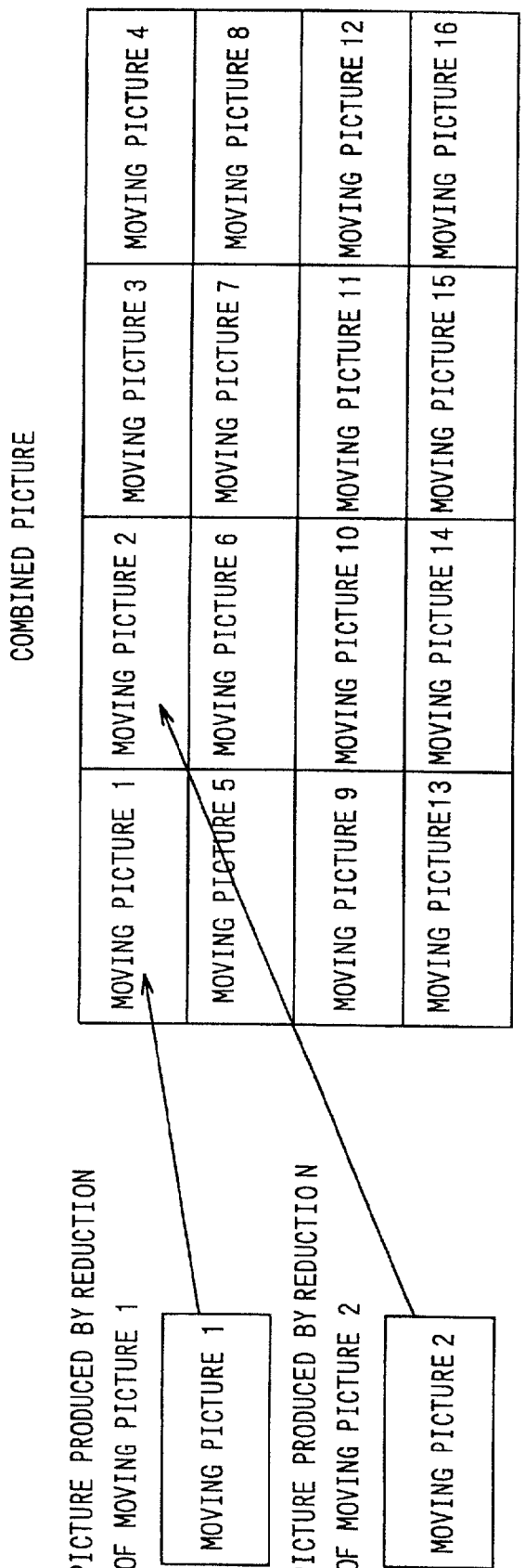
FIG. 17 is an illustration of one example of picture combination in the eighth embodiment of this invention.

Following this, the picture combining means 1506 disposes the ith frame pictures reduced by the picture reducing means 1505 so that they do not overlap with each other, thus combining into one picture (step 1606). FIG. 17 is an illustration of one example of scene combination in the picture combining means 1506. Although for the description the reduced pictures are disposed in order shown in FIG. 17, as long as the reduced pictures are arranged so as not to overlap with each other, it is possible to regularly arrange them in the vertical directions or in another way.

Furthermore, the picture combining means 1506 makes the produced ith frame combined picture stored in the combined picture storage means 1507 (step 1607), and further outputs the stored place such as the name of a file of the combined picture written in the combined picture storage means 1507 and the address, the frame number (i) and the identifier for the terminal issuing the retrieval demand to the combined picture transmission control means 1508 (step 1608).

Still further, the read-out frame number (i) is incremented by one and the operation advances for the next frame (step 1609). While the read-out frame number (i) is still lower than the number of frames of the longest moving picture data of the moving picture data, obtained by the moving picture retrieving means 1501, meeting the retrieval condition, the step 1604 to the step 1609 are repeatedly executed, thus producing the combined picture data due to the reduction and combination of the moving picture data meeting the retrieval condition (the decision "YES" in step 1610).

On the other hand, if the read-out frame number (i) is equal to or over the number of frames of the longest moving picture data, the production of the combined picture data comes to an end (the decision "NO" in step 1610).

In accordance with the operation described above, one moving picture is created by the combination of a plurality of moving picture data conforming with the retrieval condition at every terminal, and after the addition of the identifier such as the address stored in each terminal issuing the retrieval demand and the file name, the resultant combined picture is stored in the combined picture storage means 1507 of the moving picture retrieving server 1500.

Figure 18:
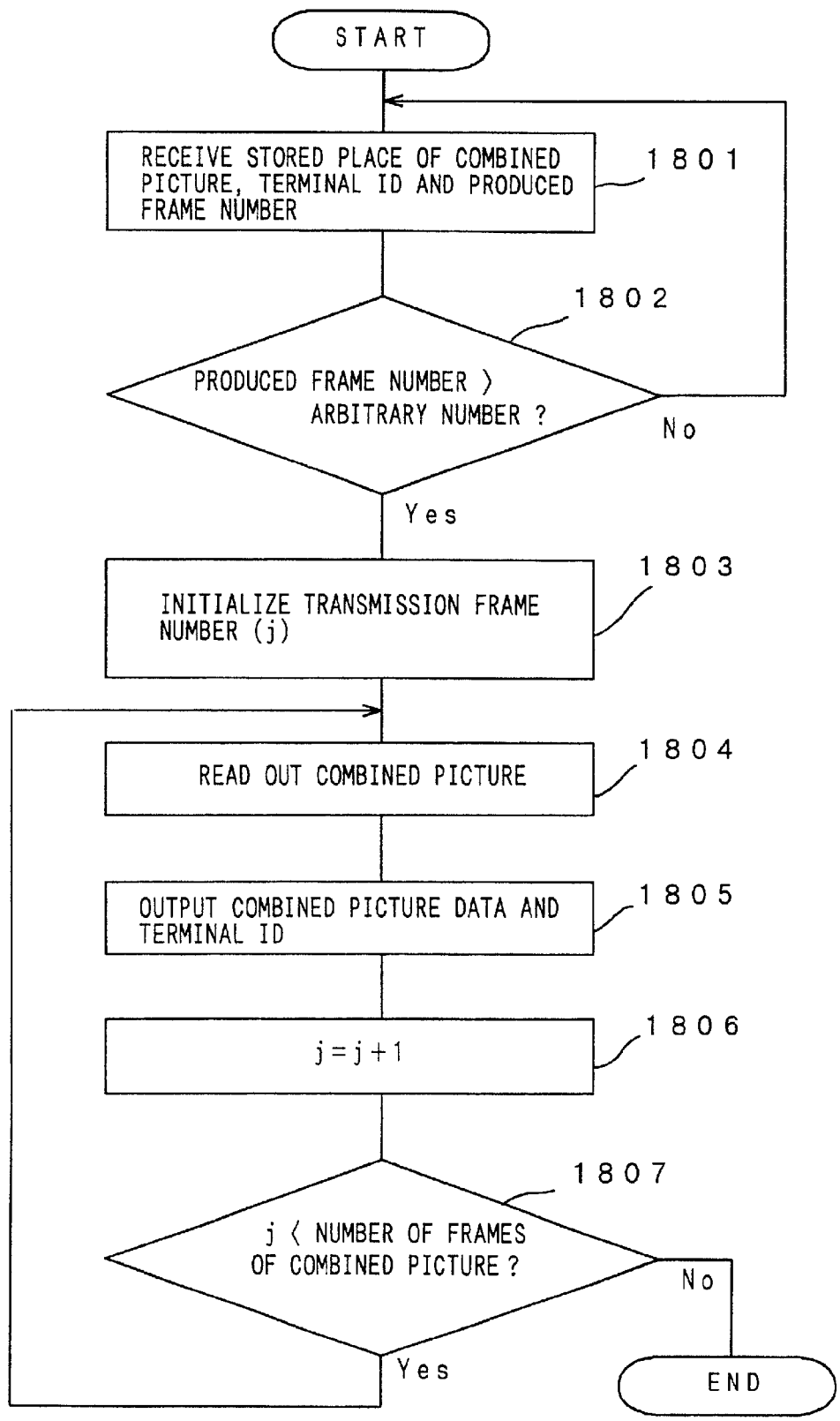
FIG. 18 is a flow chart showing an operation by a combined picture transmission control means in the eighth embodiment of this invention.

Secondly, referring to FIG. 18, a description will be made hereinbelow of a flow of an operation of the combined picture transmission control means 1508 to be taken for when conducting the transmission control of the combined picture to the terminal making the retrieval demand.

The combined picture transmission control means 1508 receives outputs the identifier indicative of the stored place such as the name of a file of the combined picture written in the combined picture storage means 1507 and the address, the frame number (i) of the produced combined picture and the identifier for the terminal issuing the retrieval demand outputted from the picture combining means 1506 (step 1801). When the frame number (i) of the produced combined picture becomes higher or larger than an arbitrary value (the decision "YES" in step 1802), a transmission frame number (j) is initialized to 0 (step 1803), and then the transmission of the combined picture to the terminal which made the retrieval demand starts.

Moreover, the combined picture transmission control means 1508 derives the picture corresponding to the transmission frame number (j) from the combined picture stored in the combined picture storage means 1507 (step 1804), and further outputs the derived combined picture data and the identifier for the terminal issuing the retrieval demand to the communication means 1509 (step 1805).

Furthermore, the transmission frame number (j) is incremented by one and the operation proceeds for the next frame (step 1806). The steps 1804 to 1806 are repeatedly executed until the transmission frame number (j) becomes higher than the frame number (i) of the produced combined picture (the decision "YES" in step 1807).

The communication means 1509 transmits the combined moving picture data to the moving picture retrieving terminal 1520 corresponding to the terminal identifier outputted from the combined picture transmission control means 1508.

With the above-described operation, under the control of the combined picture transmission control means 1508, the combined moving picture data is transmitted to the moving picture retrieving terminal 1520, specified by the aforesaid identifier, which made the input of the retrieval condition.

On the other hand, in the moving picture retrieving terminal 1520, the communication means 1522 receives the combined moving picture data transmitted from the moving picture retrieving server 1500, while the combined picture reproducing means 1523 displays the received combined moving picture data.

Although in this embodiment the user inputs the retrieval condition while the server side creates and transmits the combined picture being the retrieval result, if this retrieval is not particularly necessary, naturally, in the system arrangement the moving picture retrieving means 1501 and the retrieval condition inputting means 1521 in FIG. 15 are not particularly necessary.

Incidentally, in this case, it is also appropriate that, in addition to the above-mentioned arrangements, the combined picture being the retrieval result is further compressed and transmitted and the reception side extends and displays it. At this time, the compressing and extending methods are not particularly limited.

As described above, according to this embodiment, in the case of simultaneously displaying a plurality of moving pictures being the object of the retrieval, in the moving picture retrieving server 1500 the plurality of moving pictures are reduced and combined to produce one moving picture, while in the moving picture retrieving terminal 1520 only the one combined moving picture is reproduced, with the result that the quantity of the data flowing on the network and the quantity of the data to be processed on the terminal side reducible up to the quantity necessary for the one combined moving picture. Accordingly, the load on the network or the terminal is sharply reducible. In addition, in cases where, for the simultaneous communications of a plurality of moving picture data, the moving picture retrieving server 1520 and the moving picture retrieving terminal 1520 are connected to each other through a network whose communication speed is low, or in cases where the processing ability of the moving picture retrieving terminal 1520 is insufficient for the simultaneous reproduction of a plurality of moving picture data, the plurality of moving picture data being the retrieval result can concurrently be reproduced on one terminal. In addition, if performing the transmission and reception after the compression of the combined picture, the communication load can remarkably be cut down. This can provide great practical effects.

(Ninth Embodiment)

Figure 19:
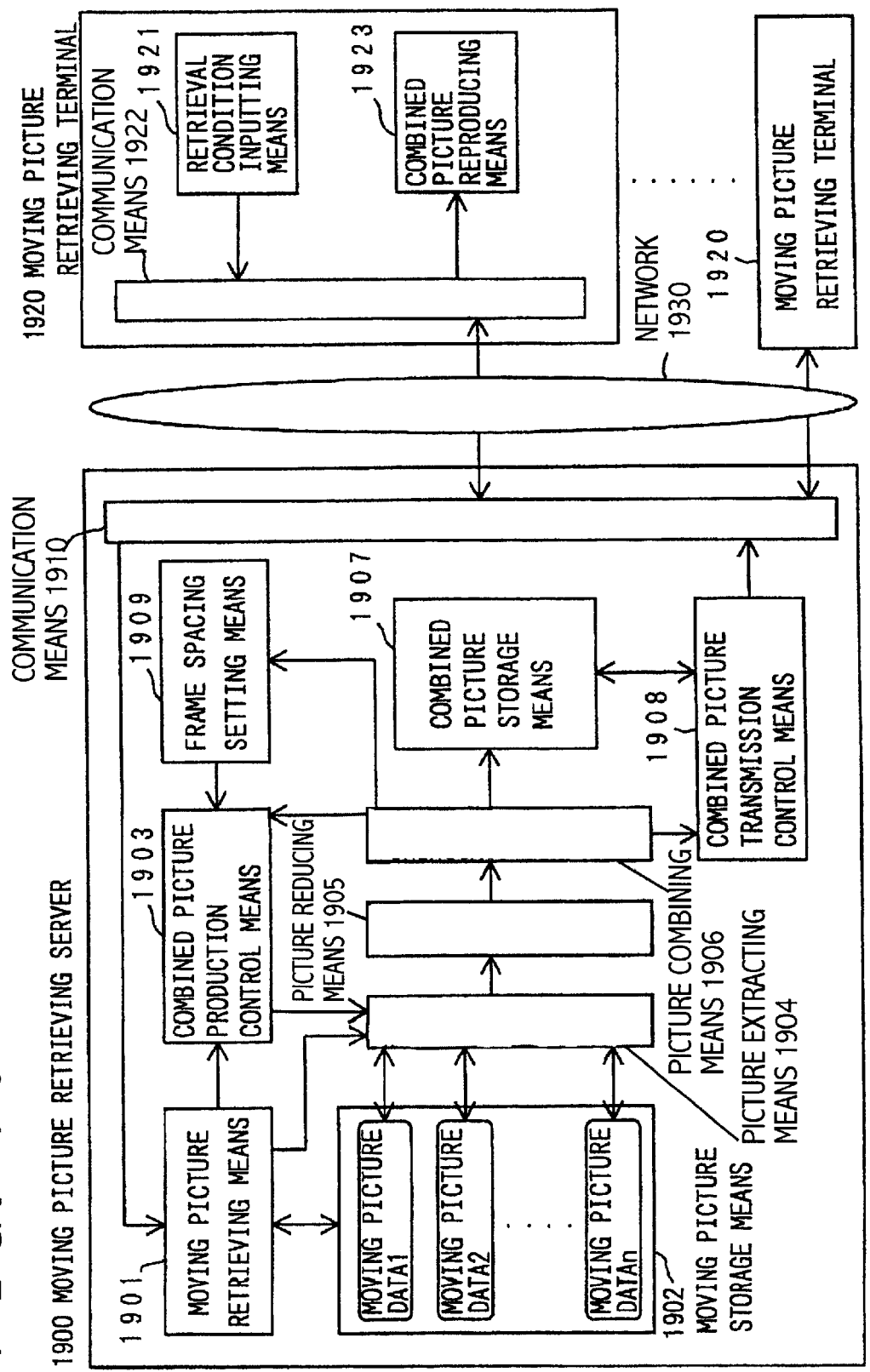
FIG. 19 shows an arrangement of a moving picture retrieving system according to a ninth embodiment of this invention.

FIG. 19 is an illustration of one example of arrangements of a moving picture retrieving system according to a ninth embodiment of the present invention. In this moving picture retrieving system, in addition to being provided with an arrangement corresponding to the arrangement of the eighth embodiment, a moving picture retrieving server 1900 is equipped with a frame spacing control means 1909 for setting a spacing between frames taken out from moving picture data stored in a moving picture storage means 1902.

Figure 20:
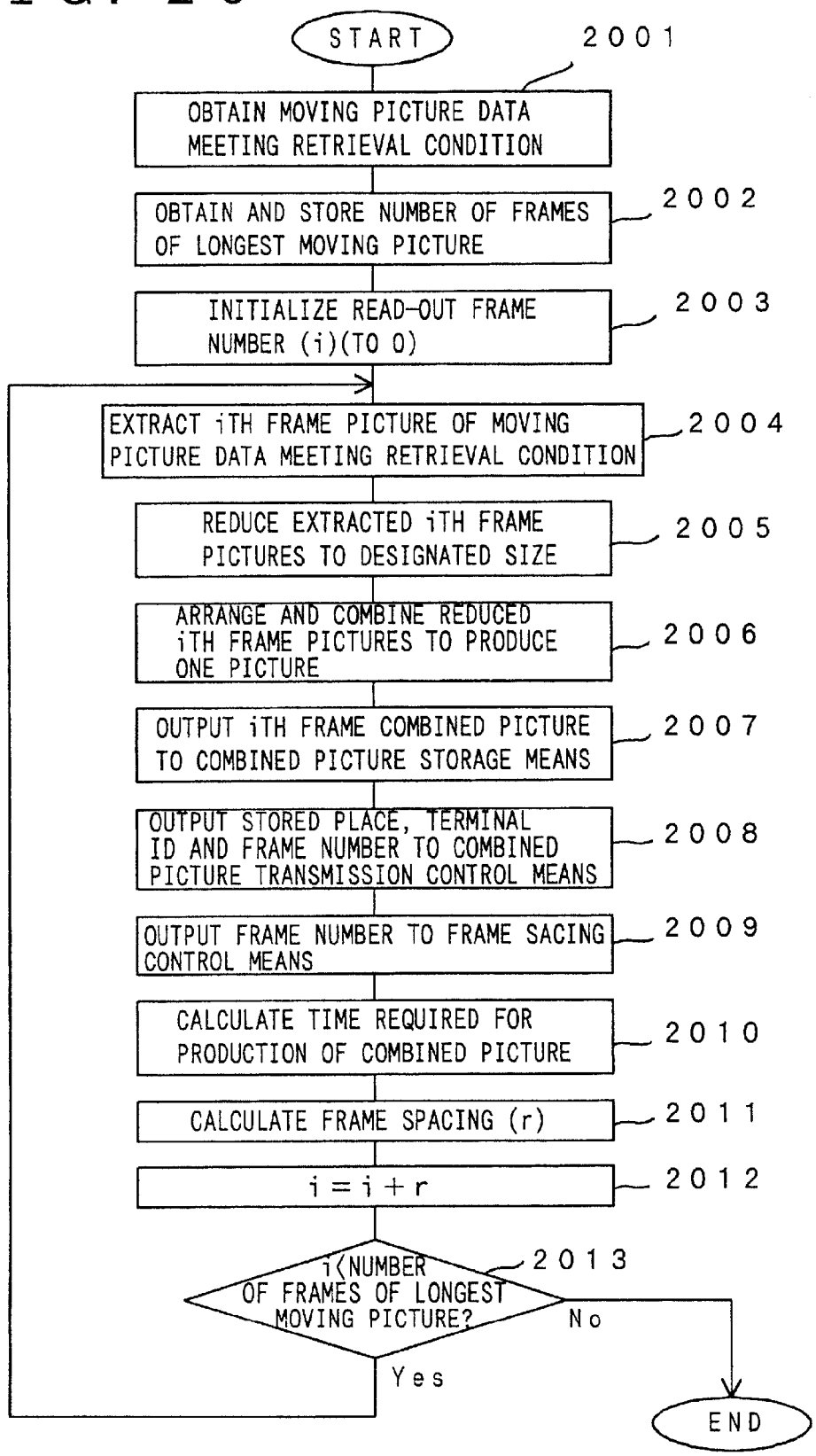
FIG. 20 is a flow chart showing multi-moving picture combining processing in the ninth embodiment of this invention.

FIG. 20 is a flow chart useful for describing an operation for moving picture combining processing in the moving picture retrieving server 1900 according to this embodiment.

First, a moving picture retrieving means 1901 retrieves moving picture data meeting the retrieval condition from the moving picture data stored in a moving picture storage means 1902 (step 2001), and obtains the number of frames of the data, taking the longest time, of the moving picture data conforming with the retrieval condition and outputs it to a combined picture production control means 1903 (step 2002), and further initializes the read-out frame number (i) to 0 and outputs an identifier for the moving picture meeting the retrieval condition and information indicative of the start of the production of a combined picture to a picture extracting means 1904 (step 2003).

Secondly, the picture extracting means 1904 extracts the picture of the ith frame from the moving picture data meeting the retrieval condition obtained by the moving picture retrieving means 1901 (step 2004).

A picture reducing means 1905 reduces the ith frame picture data of the moving picture data extracted by the picture extracting means 1904 at an arbitrary reduction ratio set in advance (step 2005).

Subsequently, a picture combining means 1906 disposes the ith frame pictures reduced by the picture reducing means 1905 so that they do not overlap with each other, thus combining into one picture (step 2006). In addition, the picture combining means 1906 outputs the produced ith frame combined picture to a combined picture storage means 1907 (step 2007), and further outputs the stored place such as the name of a file of the combined moving picture written in the combined picture storage means 1907 and the address, the frame number (i) and the identifier for the terminal which made the retrieval demand to a synthesized picture transmission control means 1908 (step 2008). Further, the frame number (i) is outputted to the frame spacing control means 1909 (step 2009).

The frame spacing control means 1909 stores the frame number outputted from the picture combining means 1906 and the time of the reception of the aforesaid frame number in a pair, and obtains the time taken for the production of the combined picture of an arbitrary number (n) of frames on the basis of the frame number (i) and the time of the reception of the frame number (i−n) preceding by the arbitrary number of frames (step 2010), and further obtains the time necessary for the production of one combined picture and calculates a reading omission (umping) spacing (r) between frames on the basis of the number of frames of the original moving picture data per one second (step 2011).

Although in this embodiment the frame number and the time of the completion of the combination of the frame with the aforesaid frame number are recorded to calculate the time taken for the production of the combined picture whenever one combined picture is produced, it is also appropriate that the steps 2010 and 2011 are executed at an interval of the completion of an arbitrary number (2 or more) of combined pictures to calculate and change the frame spacing.

Moreover, a combined picture production control means 1903 increases the read-out frame number (i) by the frame spacing (r) and the operation advances for the next frame (step 2012). When the read-out frame number (i) does not reach the number of frames of the longest moving picture, the steps 2004 to 2012 are repeatedly executed to reduce and combine the moving picture data meeting the retrieval condition (the decision "YES" in step 2013).

On the other hand, if the read-out frame number (i) exceeds the number of frames of the longest moving picture, the production of the combined picture data comes to an end (the decision "NO" in step 2013).

As described above, according to this embodiment, in cases where the load on the server increases because of receiving retrieval demands from a plurality of terminals, or in cases where the picture combining processing speed in the server becomes low, since the moving pictures are combined while adequately adjusting the frame spacing and the produced moving picture is forwarded, the moving picture combined at the real time on the moving picture retrieving server side is reproducible on the moving picture retrieving terminal side without being frequently broken. This can provide great practical effects.

(Tenth Embodiment)

Figure 21:
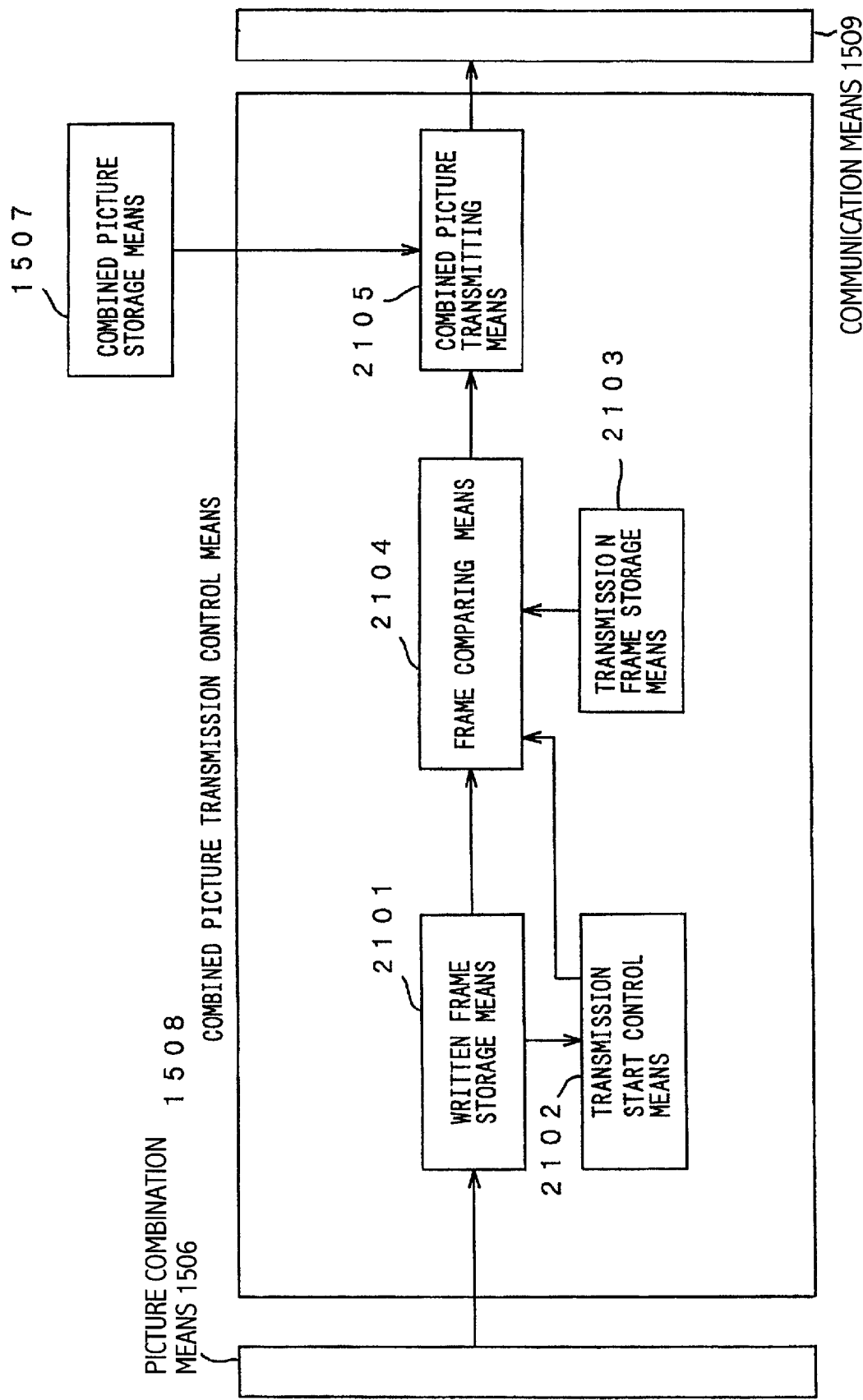
FIG. 21 shows an arrangement of a combined picture transmission control means of a moving picture retrieving server according to a tenth embodiment of this invention.

FIG. 21 is an illustration of one example of arrangements of a combined picture transmission control means of a moving picture retrieving server in a moving picture retrieving system according to a tenth embodiment of the present invention, and is a block diagram for describing an arrangement of the combined picture transmission control means of the moving picture retrieving server 1500 according to the above-described eighth embodiment in more detail. In FIG. 21, the combined picture transmission control means is composed of a written frame storage means 2101 for storing a written frame number (i) outputted from the picture combining means 1506, a transmission start control means 2102 for controlling the start and end of the transmission of the produced combined picture to a terminal, a transmission frame storage means 2103 for storing a transmission frame number (j), a frame comparing means 2104 for comparing the written frame number (i) stored in the written frame storage means 2101 with the transmission frame number (j) stored in the transmission frame storage means 2103 to set a frame number to be forwarded next, and a combined picture transmitting means 2105 for reading out the combined picture corresponding to the transmission number (j) set in the frame comparing means 2104 from the combined picture storage means 1507 and further for transmitting the read combined picture with the transmission frame number (j) to the communication means 1509.

Figure 22:
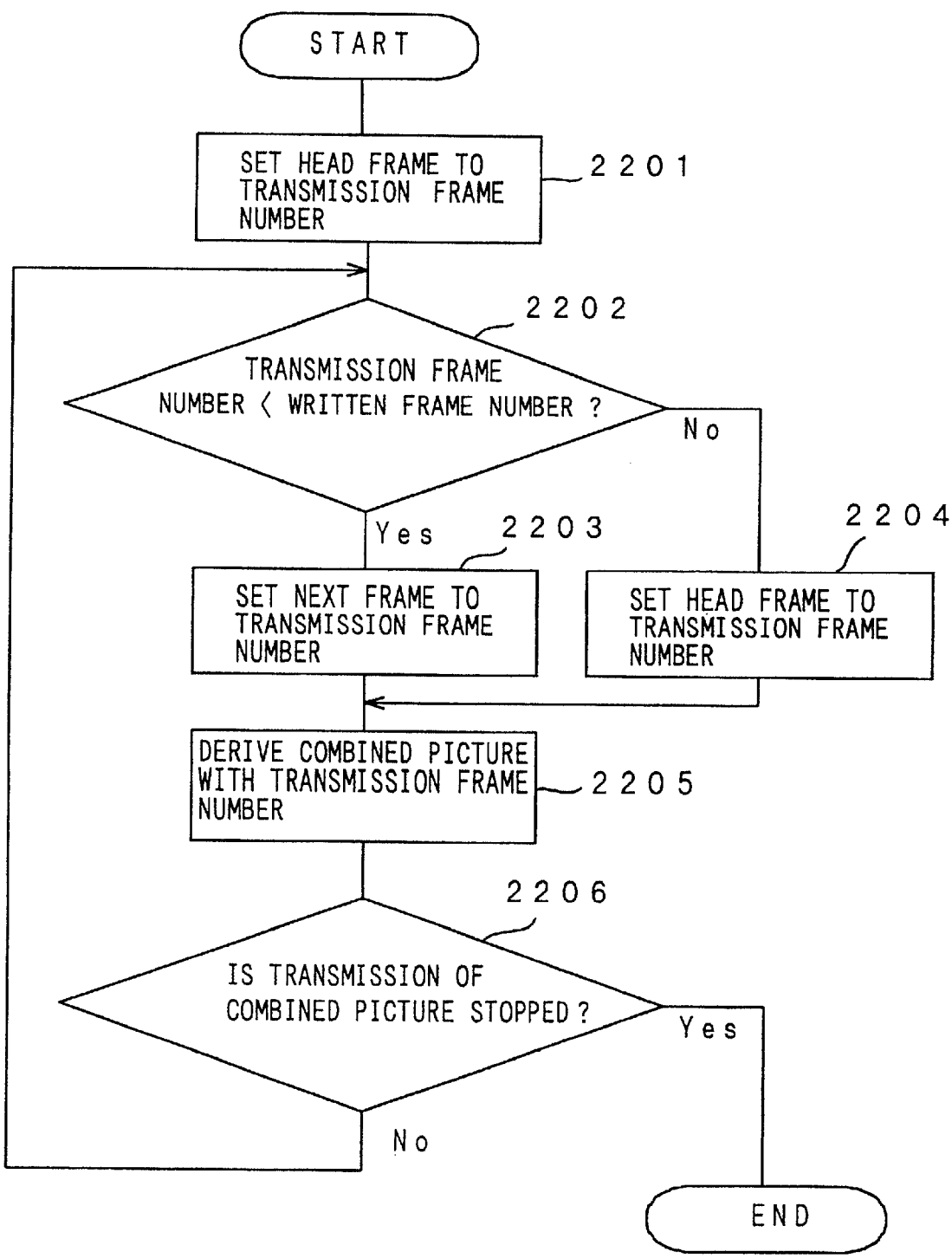
FIG. 22 is a flow chart showing combined picture transmission control processing in the tenth embodiment of this invention.

FIG. 22 is a flow chart showing an operation for the combined picture transmission control processing by the combined picture transmission control means (1508) according to this embodiment.

First, the written frame storage means 2101 stores the written frame number (i) of the combined picture outputted from the picture combining means 1506. The transmission start control means 2102 sets the head frame to the transmission frame number (j) when the aforesaid written frame number (i) exceeds an arbitrary frame number set beforehand and gives an instruction for the start of the transmission of the combined picture to the frame comparing means 2104 (step 2201).

Secondly, the frame comparing means 2104 compares the transmission frame number (j) with the written frame number (i). If the transmission frame number (j) is lower than the written frame number (i) (the decision "YES" in step 2002), it sets j+1 as the next transmission frame number and outputs the aforesaid transmission frame number to the combined picture transmitting means 2105 and the transmission frame storage means 2103 (step 2003).

Contrary to this, if the transmission frame number (j) becomes higher than the written frame number (i) (the decision "NO" in step 2002), the frame comparing means 2104 sets the head frame as the next transmission frame number and outputs the aforesaid transmission frame number to the combined picture transmitting means 2105 and the transmission frame storage means 2103 (step 2004).

Incidentally, although the above description has been made in terms of the case of transmitting all the frames, in the case of transmitting the combined picture at an interval of n frames, the next transmission frame number to be set becomes j+n+1. Further, when the next transmission frame number j+n+1) is higher than the written frame number (i), the head frame number being 0 is set for the next transmission frame.

Subsequently, the combined picture transmitting means 2105 gets the combined picture with the transmission frame number set in the frame comparing means 2104 and outputs it to the communication means 1509 (step 2205). The aforesaid steps 2202 to 2205 are done until the notice of a demand for stopping the transmission of the combined picture occurs from the transmission start control means 2102 to the frame comparing means 2104 (the decision "YES" in step 2206).

As a way of stopping the transmission of the combined picture, there may be a method in which the transmission start control means 2102 decides whether or not the production of the combined picture with the longest data of the original data of the combined moving picture data completes and the written frame number (i) becomes equal to the transmission frame number (j) or a method of receiving a demand for stopping the transmission of the combined picture from a moving picture retrieving terminal through the communication means 1509. In this embodiment, the processing from the step 2202 to the step 2205 is not affected even if stopping the transmission of the combined picture in every way.

Figure 23:
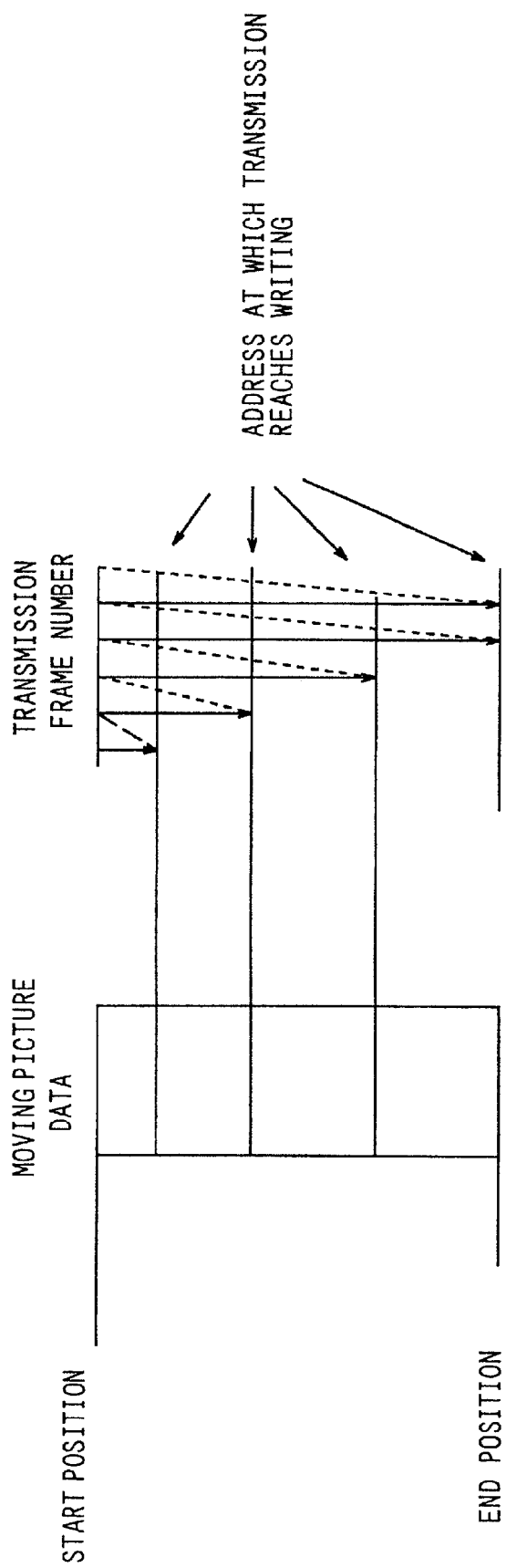
FIG. 23 illustrates a state of reproduction of a combined picture in the tenth embodiment of this invention.

FIG. 23 is an illustration of a state of the reproduction of the combined moving picture data in this embodiment. As shown in FIG. 23, when the reproduction up to the frame number that the production of the combined moving picture data comes to an end reaches completion, the reproduction from the head frame is newly made, with the result that the combined moving picture data is repeatedly reproduced in a state of making the most of the combined picture under production.

As described above, according to this embodiment, in the combined picture transmission control means, the written frame is compared with the transmission frame, and if the transmission frame number becomes equal to or higher than the written frame number, the next transmission frame number is set to 0 and the reproduction of the moving picture is repeatedly done from the head. Accordingly, since the reproduction of the combined picture is repeatedly made in a manner of making the most of the moving picture under combination, the same scene is repeatedly reproduced so that the newly produced combined picture is added little by little, which makes it easy to find the directing scene. In addition, since the transmission of the combined picture data and the reproduction on the retrieving terminal can start before the completion of the production of the combined moving picture data, the waiting time necessary till the start of the reproduction of a plurality of moving picture data meeting the retrieval condition becomes shorter, which can provide great practical effects.

(Eleventh Embodiment)

Figure 24:
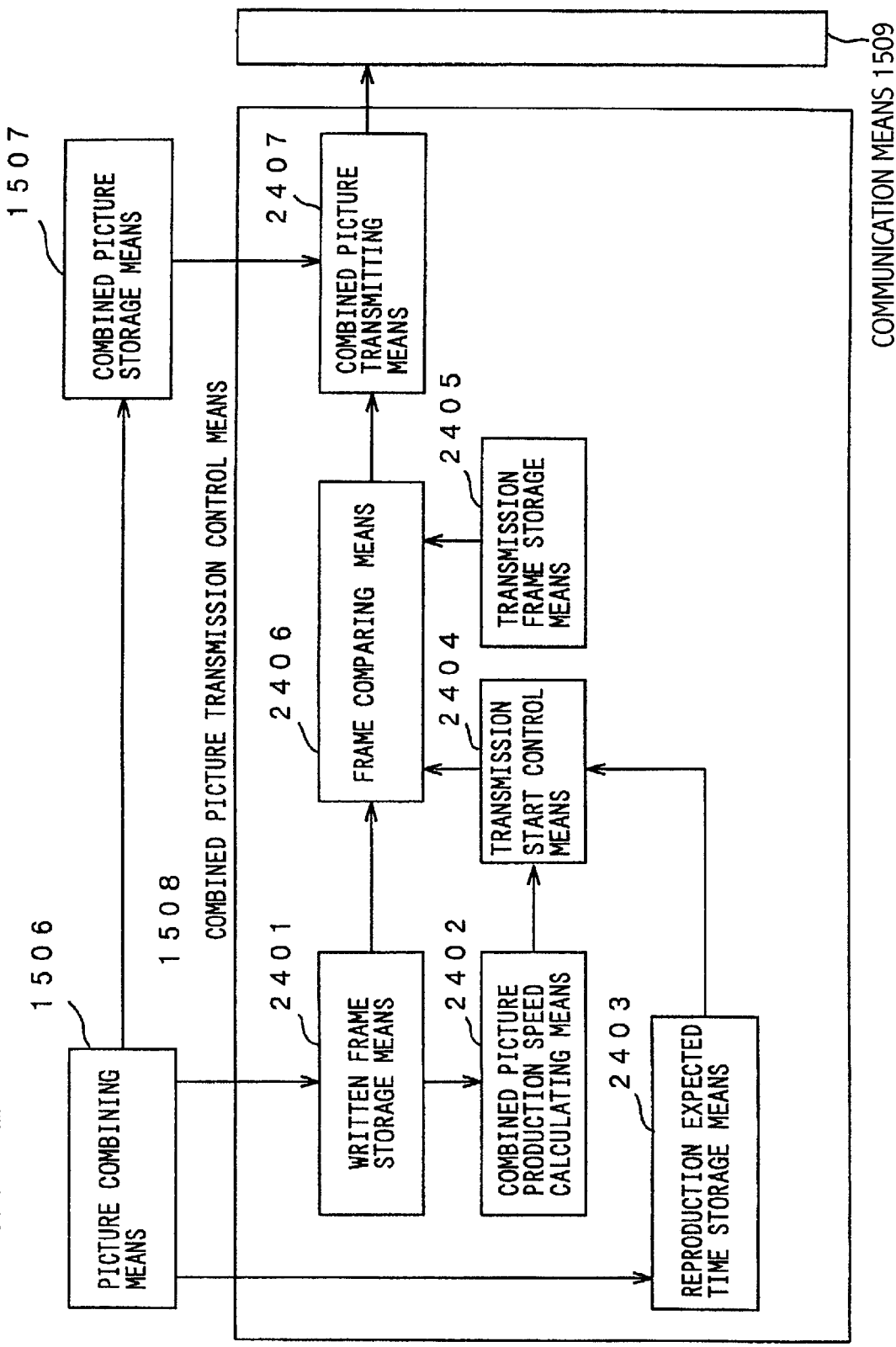
FIG. 24 shows an arrangement of a combined picture transmission control means of a moving picture retrieving server according to an eleventh embodiment of this invention.

FIG. 24 is an illustration of one example of arrangements of a combined picture transmission control means of a moving picture retrieving server in a moving picture retrieving system according to an eleventh embodiment of the present invention, and more specifically, is a block diagram showing another example of arrangements of the combined picture transmission control means in the above-described eighth embodiment. In FIG. 24, the combined picture transmission control means (1508) is made up of a written frame storage means 2401 for storing a written frame number (i) outputted from the picture combining means 1506, a combined picture production speed calculating means 2402 for calculating a production speed of the combined picture in the picture combining means 1506, a reproduction expected time storage means 2403 for storing an expected time of reproduction of combined moving picture data being retrieved, and a transmission start control means 2404 for controlling the start of transmission of a combined picture under production on the basis of the combined picture production speed stored in the combined picture production speed calculating means and the reproduction expected time stored in the reproduction expected time storage means 2403. Also included therein are a transmission frame storage means 2405 for storing a transmission frame number (j), a frame comparing means 2406 for comparing the written frame number (i) stored in the written frame storage means 2401 with the transmission frame number (j) stored in the transmission frame storage means 2405 to set a frame number to be forwarded, and a combined picture transmitting means 2407 for reading out the combined picture with the transmission frame number (j) set in the frame comparing means 2406 from the combined storage means 1507 to transmit the read combined picture of the transmission frame number (j) to the communication means 1509.

Figure 25:
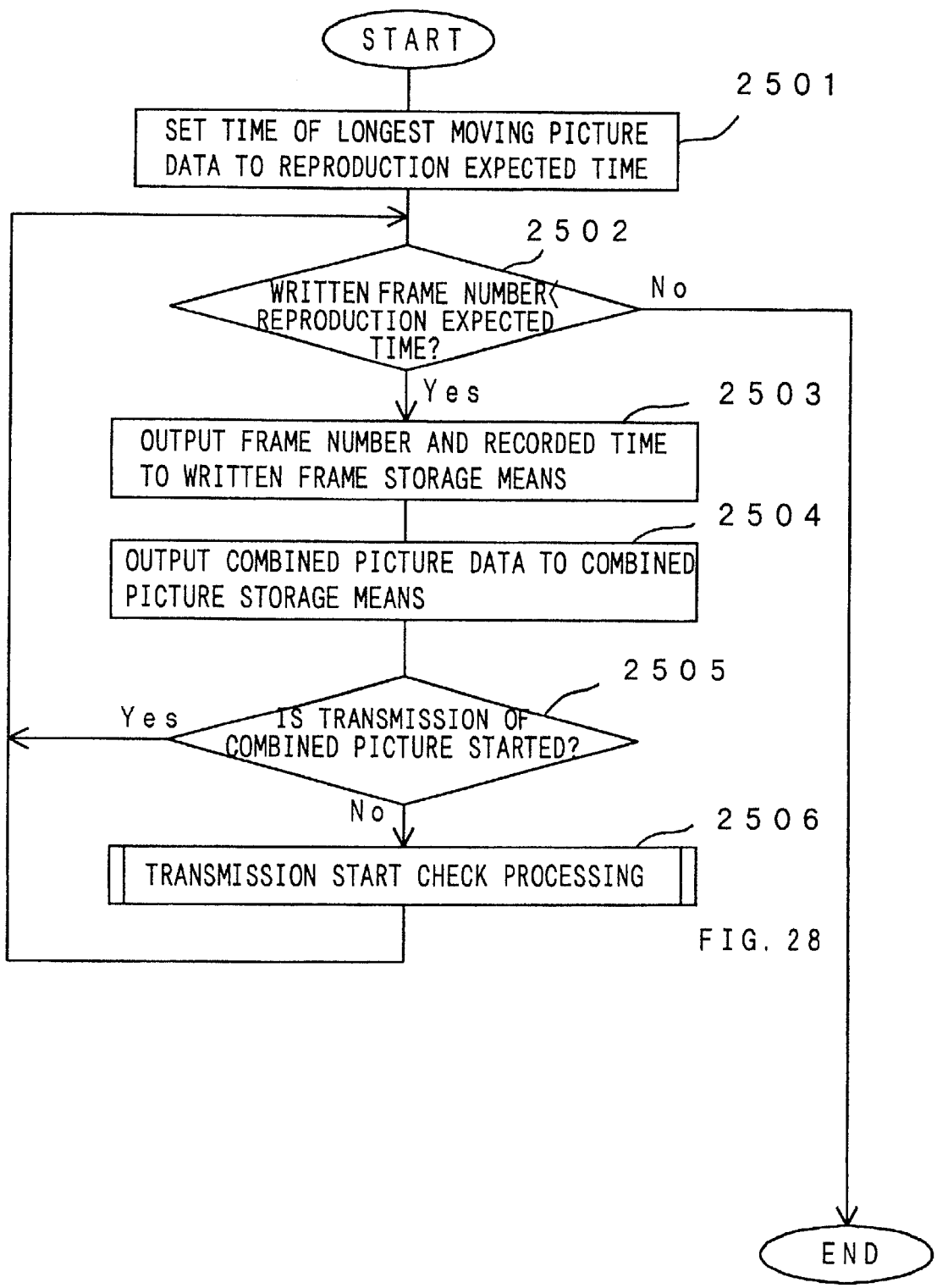
FIG. 25 is a flow chart showing picture combining processing in the eleventh embodiment of this invention.

FIG. 25 is a flow chart showing the picture combining processing in the moving picture retrieval system according to this embodiment. The operation will be described hereinbelow with reference to FIG. 25 in addition to FIG. 24.

The picture combining means 1506 stores, as the reproduction expected time of combined moving picture data for retrieval, the time of the longest moving picture data of the moving picture data meeting the retrieval condition, obtained by the moving picture retrieving means 1501, in the reproduction expected time storage means 2403 (step 2501).

Subsequently, while the written frame number (i) (the time corresponding to the number of frames) is shorter than the reproduction expected time, the following processing is repeatedly executed (step 2502). That is, the picture combining means 1506 pairs the written frame number (i) and the time taken until writing the frames from the frame number 0 to the frame number i and stores them in the written frame storage means 2401 (step 2503), and makes the combined picture with the written frame number (i) in the combined picture storage means 1507 (step 2504).

If the transmission of the combined picture does not start yet (the decision "NO" in step 2505), transmission start check processing is put into execution (step 2506).

The above-mentioned steps 2503 to 2506 are repeatedly executed until the written frame number becomes higher than the number of frames of the reproduction expected time, thus producing combined picture data with a length corresponding to the reproduction expected time.

Figure 26:
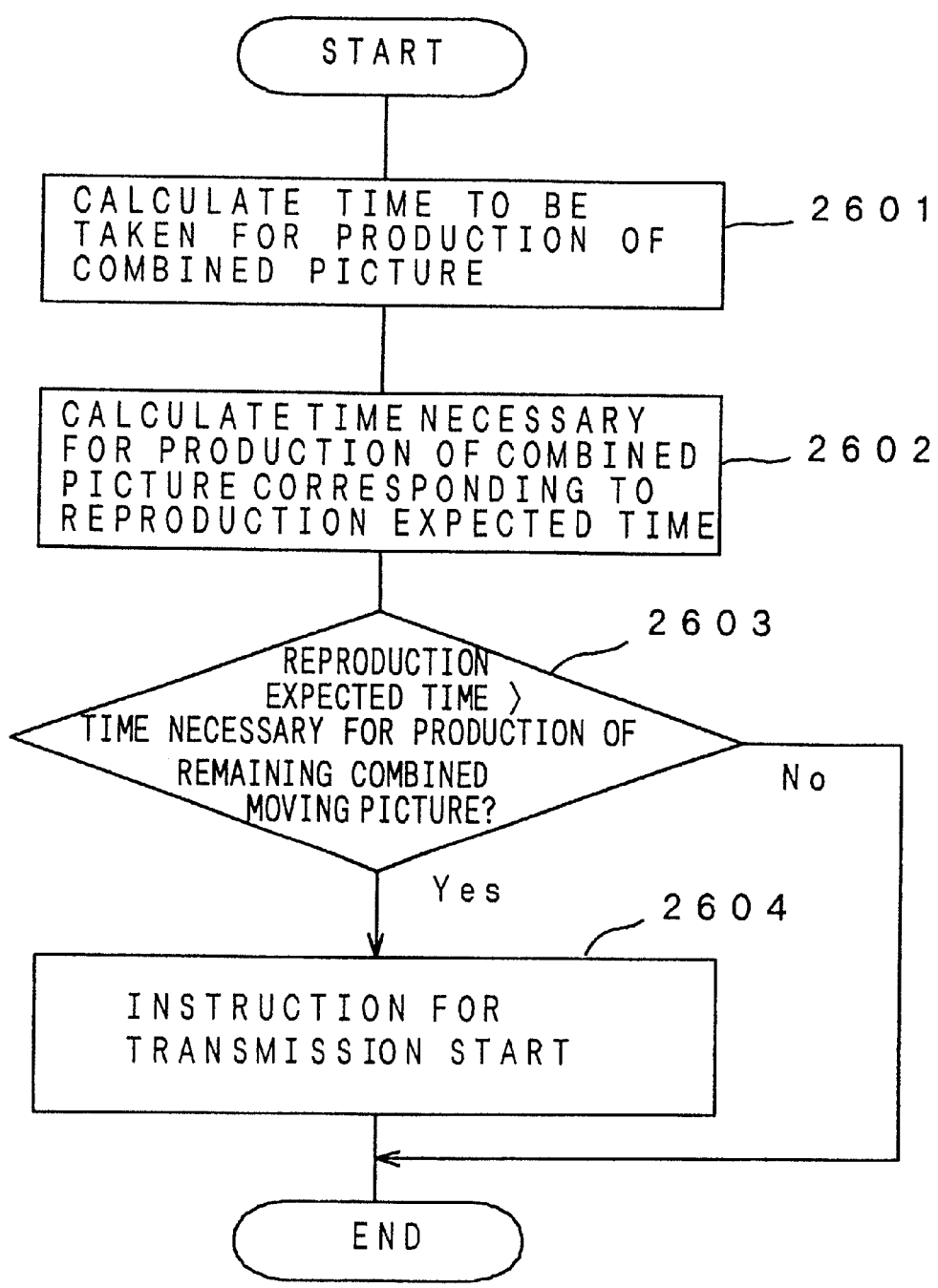
FIG. 26 is a flow chart showing transmission start check processing in the eleventh embodiment of this invention.

FIG. 26 is a flow chart showing the transmission start check processing. The combined picture transmission start check processing will be described hereinbelow with reference to FIG. 26 in addition to FIG. 24.

The combined picture production speed calculating means 2402 obtains the time required for the production of a combined picture on the basis of the written frame number (i) stored in the written frame storage means 2401 and the time taken until writing the ith frame (step 2601).

The transmission start control means 2404 calculates the time necessary for the production of the combined picture corresponding to the reproduction expected time on the basis of the time for the production of the combined picture calculated by the combined picture production speed calculating means 2402 and the reproduction expected time stored in the reproduction expected time storage means 2403 (step 2602).

Furthermore, the transmission start control means 2404 calculates the time necessary for the production of the combined picture corresponding to the remainder of the reproduction expected time on the basis of the written frame number (i) stored in the written frame storage means 2401 and the calculated necessary time for the production of the combined picture corresponding to the reproduction expected time (step 2603).

When the time necessary for the production of the moving picture corresponding to the remainder of the reproduction expected time becomes shorter than the reproduction expected time (the decision "YES" in step 2603), an instruction for the start of the transmission of the moving picture data is outputted to the frame comparing means 2406 (step 2604).

Figure 27:
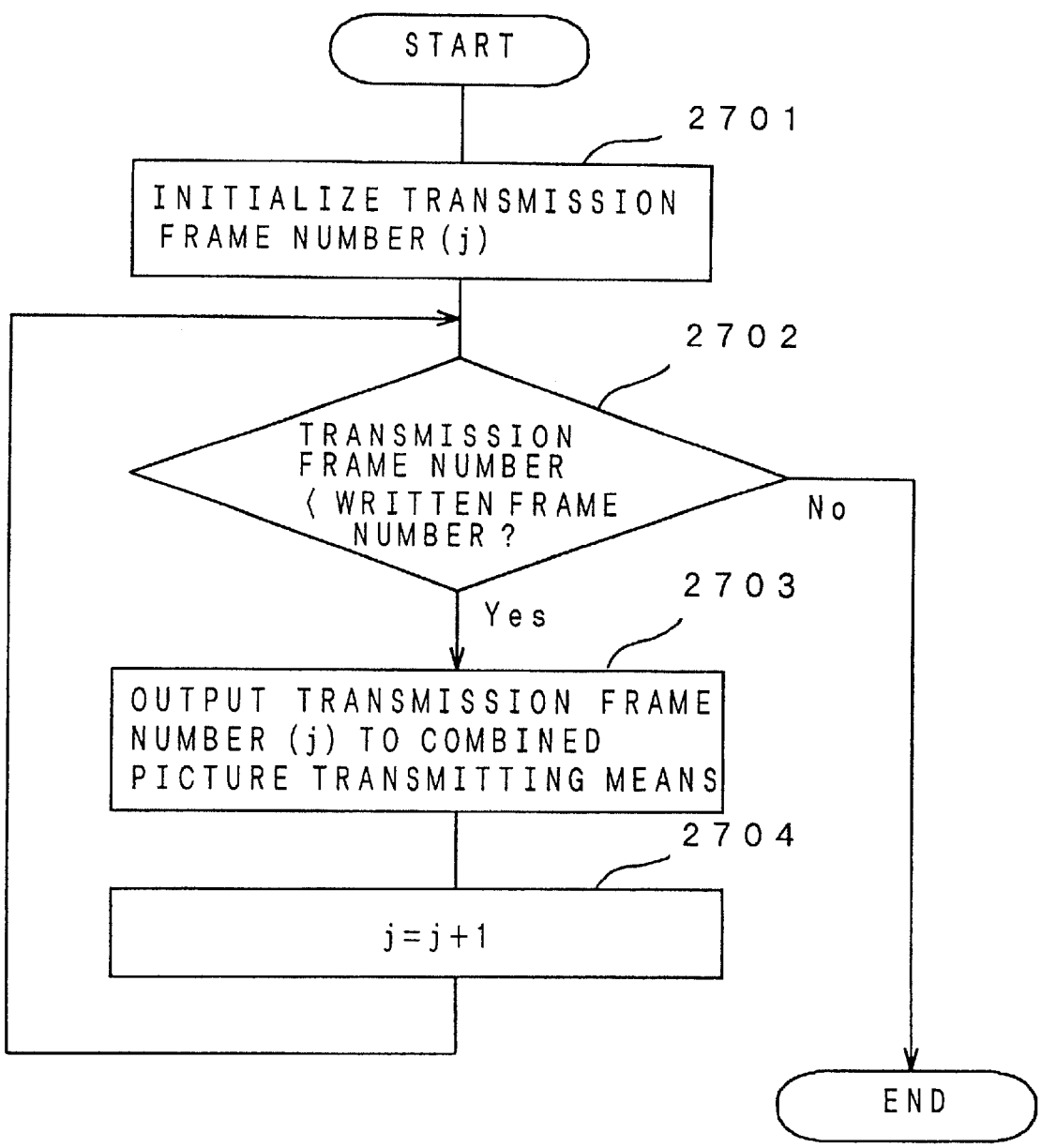
FIG. 27 is a flow chart showing moving picture transmission processing in the eleventh embodiment of this invention.

FIG. 27 is a flow chart showing moving picture transmission processing in the frame comparing means 2406. The moving picture transmission processing will be described hereinbelow with reference to FIG. 27 in addition to FIG. 24.

The frame comparing means 2406 receives a transmission start instruction outputted from the transmission start control means 2404 and initializes the transmission frame number (j) (step 2701).

In addition, the frame comparing means 2406 outputs the transmission frame number 0) to the combined picture transmitting means 2407 (step 2703) while the transmission frame number stored in the transmission frame storage means 2405 is lower than the written frame number (i) stored in the written frame storage means 2401 (the decision "YES" in step 2702). Moreover, the transmission frame number is incremented by one (step 2704), and the steps 2702 to 2704 are repeatedly executed while the transmission frame number (j) is lower than the written frame number (i) (the decision "YES" in step 2702).

On the basis of the transmission frame number outputted from the frame comparing means 2406, the combined picture transmitting means 2407 forwards to the moving picture retrieving terminal 1520 the combined picture data with the aforesaid transmission frame number stored in the combined picture storage means 1507.

As described above, according to this embodiment, the time to be taken for the production of the combined moving picture data for retrieval with the length corresponding to reproduction expected time is calculated on the basis of the reproduction expected time for the moving picture for the retrieval and the combined picture production speed, and the transmission of the combined picture is made to start after the elapse of a given time so that, until the reproduction of the retrieval combined moving picture data corresponding to the reproduction expected time of the retrieval moving picture reaches completion, the production of all the retrieval combined moving picture data reaches completion. Whereupon, the reproduction of a plurality of moving picture data meeting the retrieval condition can start after the elapse of a short waiting time without waiting the completion of the production of the combined moving picture data corresponding to the reproduction expected time, which can provide great practical effects.

(Twelfth Embodiment)

Figure 28:
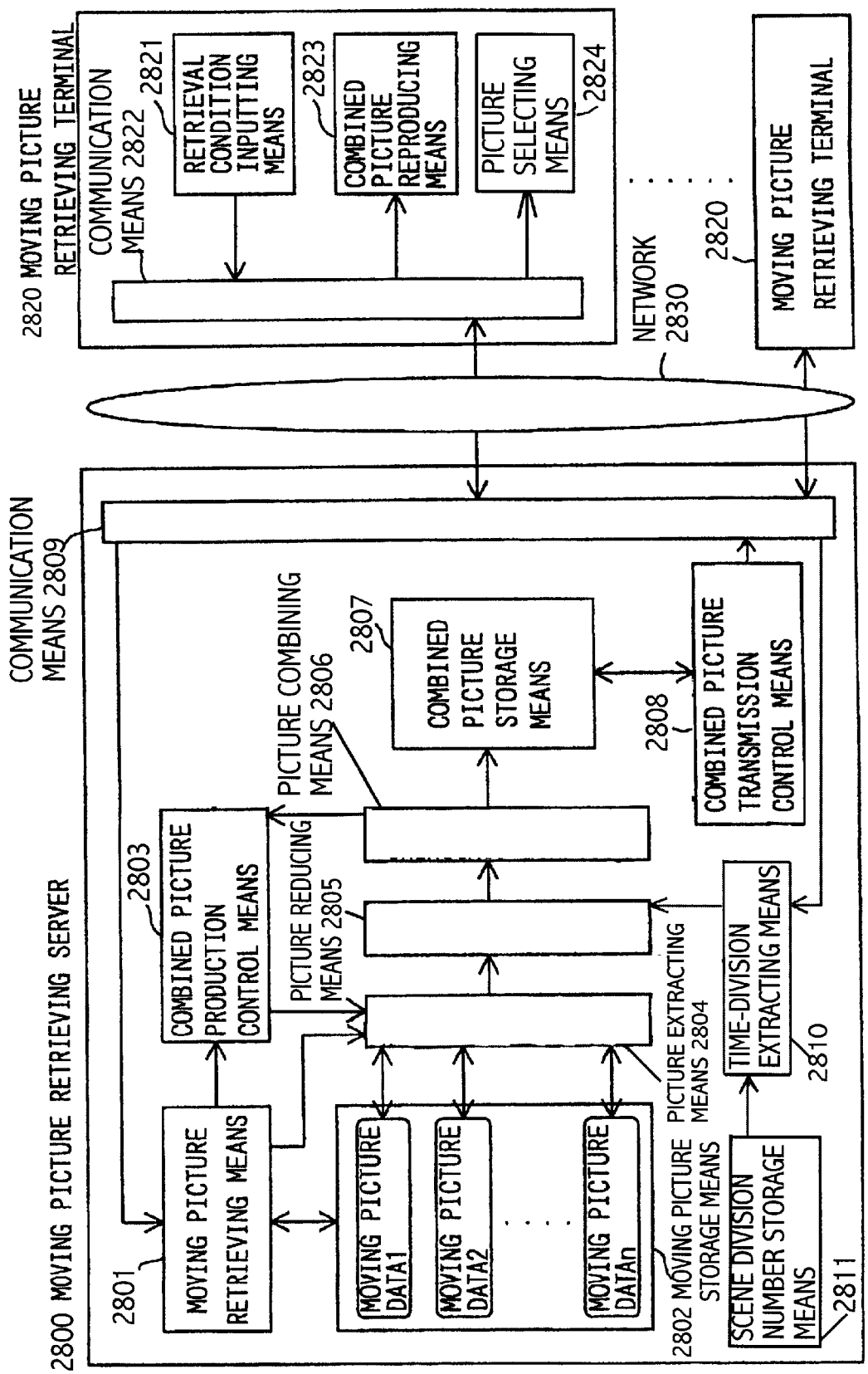
FIG. 28 shows an arrangement of a moving picture retrieving system according to a twelfth embodiment of this invention.

FIG. 28 is an illustration of one example of arrangements of a moving picture retrieving system according to a twelfth embodiment of the present invention. In this embodiment, the moving picture retrieving system has the arrangement according to the eighth embodiment, and further, a moving picture retrieving terminal 2820 is provided with a picture selecting means 2824 for selecting desired moving picture data from among a combined picture meeting a retrieval condition, and a moving picture retrieving server 2800 is equipped with a scene division number storage means 2811 for storing the number of divisions of a scene of a combined picture to be reproduced in the combined picture reproducing means 2823, and a time division extracting means 2810 for deriving from a moving picture storage means 2802 the moving picture data which are selected through the use of the picture selecting means 2824 of the moving picture retrieving terminal 2820 and among which the reproduction start times are staggered.

First, a description will be made hereinbelow of a moving picture selecting method by the picture selecting means 2824 of the moving picture retrieving terminal 2820. In the moving picture retrieving terminal 2820, through the use of the picture selecting means 2824, the user selects one desired data from among a combined picture which is under reproduction in the combined picture reproducing means 2823. Among the selecting ways, for example, there may be a method of selecting moving picture by designating an area on a scene of a combined picture under reproduction through the use of a pointing device such as a mouse and a method of selecting moving picture in a list indicating individual information on the moving picture data constituting a combined picture. In this embodiment, there is no limitation in the selecting method.

An identifier for the moving picture data selected by the picture selecting means 2824 of the moving picture retrieving terminal 2820 is transmitted through a network 2830 to the moving picture retrieving server 2800 and then handed over to the time-division extracting means 2810.

Figure 29:
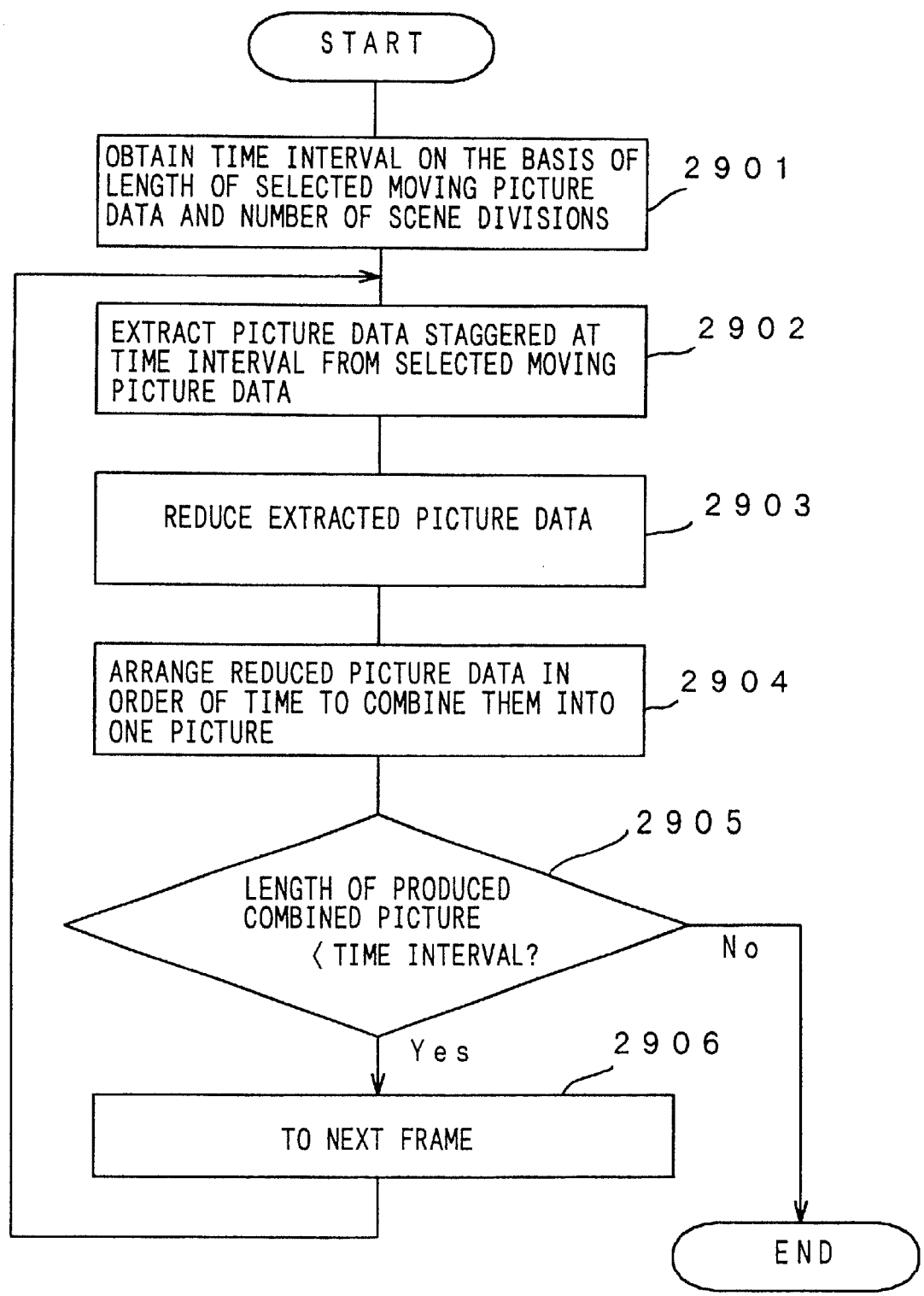
FIG. 29 is a flow chart showing combined picture production processing in the twelfth embodiment of this invention.

FIG. 29 is a flow chart for describing picture combining processing in a picture reducing means 2805, a picture combining means 2806 and the time-division extracting means 2810 where picture are extracted from the selected moving picture data in a state of staggering the time little by little and combined.

The time-division extracting means 2810 obtains the length of the moving picture data selected by the picture selecting means 2824 of the moving picture retrieving terminal 2820 and calculates a time interval conforming with the number of divisions of the scene stored in the scene division number storage means 2811 (step 2901). The following processing is repeatedly executed until the production of the combined picture data with the length of the calculated time interval reaches completion.

The time-division extracting means 2810 extracts the picture data of frames appearing at the calculated time interval from the selected moving picture data stored in a moving picture storage means 2802 according to the number of scene divisions and outputs them to the picture reducing means 2805 in order of time (step 2902).

The picture reducing means 2805 reduces the picture data extracted at the time interval conforming with the number of scene divisions outputted from the time-division extracting means 2810 and outputs them to the picture combining means 2806 in order of time (step 2903).

The picture combining means 2806 arranges the pictures, extracted and reduced in a state of staggering the reproduction start time, in the order of the extraction times in the time division extracting means 2810 as shown in FIG. 30 to combine them as one picture, and makes the combined picture stored in a combined picture storage means 2807 (step 2904).

Subsequently, a combined picture production control means 2803 checks whether or not the length of the produced combined picture reaches the calculated time interval (step 2905). If not reaching the calculated time interval (the decision "YES" in step 2905), it gives an instruction for the extraction of the next frame picture to the picture extracting means 2804 (step 2906). In the above-described way, the combined picture made by reducing and combining the picture data extracted in a state where the reproduction start times are staggered in order of the times divided in the time-division extracting means 2810 is produced by the number of frames corresponding to the time interval, and then stored in the combined picture storage means 2807 of the moving picture retrieving server 2800.

The combined moving picture data stored in the combined picture storage means 2807 is transmitted to the moving picture retrieving terminal 2820 under control of a combined picture transmission control means 2808 of the moving picture retrieving server 2800 and then displayed on a combined picture displaying means 2823 of the moving picture retrieving terminal 2820.

As described above, according to this embodiment, in addition to the processing of the eighth embodiment, a combined moving picture is produced on the basis of desired moving picture data designated in the picture selecting means 2824 of the moving picture retrieving terminal 2820 by means of the reduction and combination of the moving picture data where the reproduction start times are staggered according to the length of the moving picture data in the time-division extracting means 2810, and the produced combined moving picture is displayed on the combined picture displaying means 2823. Whereupon, the contents of the selected moving picture data are more finely seen, and the quick retrieval of the directing scene becomes possible, which can provide great practical effects.

(Thirteenth Embodiment)

Figure 31:
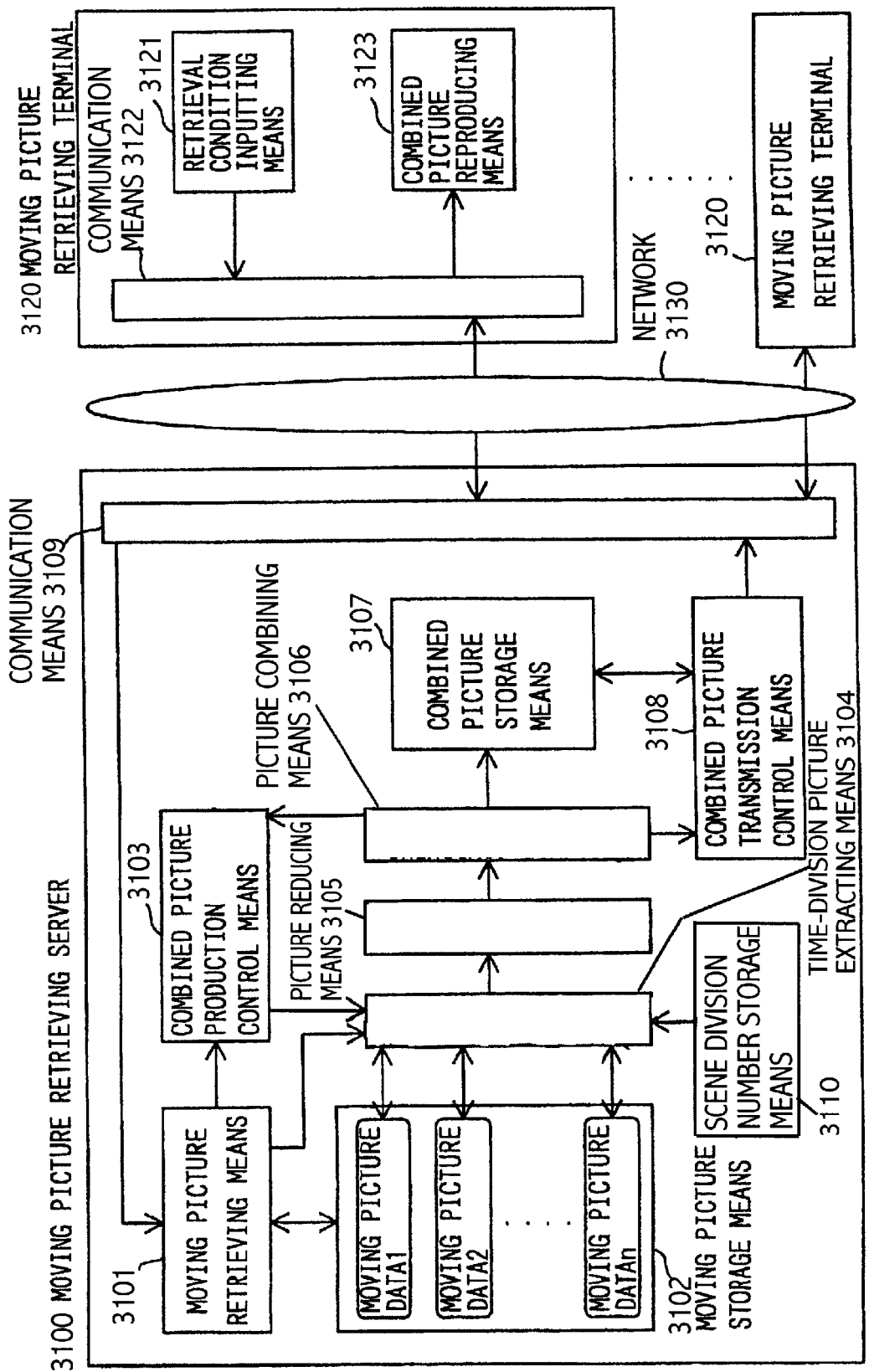
FIG. 31 shows an arrangement of a moving picture retrieving system according to a thirteenth embodiment of this invention.
Figure 32:
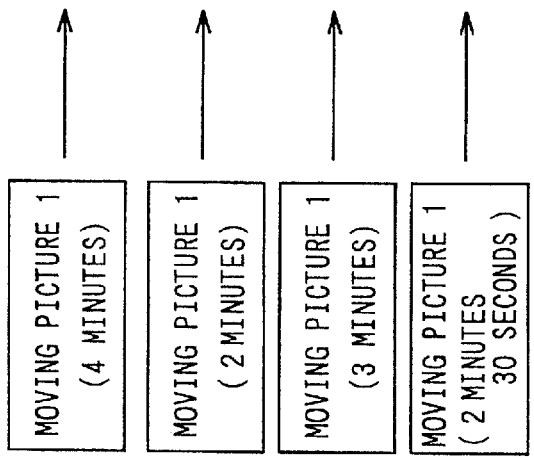
FIG. 32 is an illustration of one example of dispositions of reduced pictures in the thirteenth embodiment of this invention.
Figure 33:
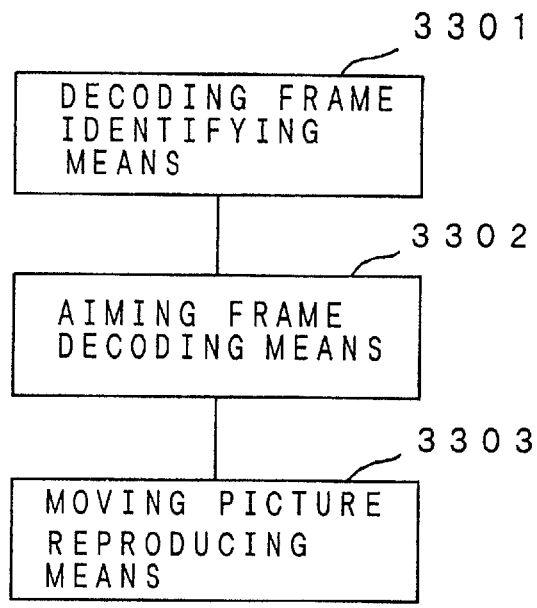
FIG. 33 is an illustration of an arrangement of a picture display unit based on a prior technique.
Figure 34:
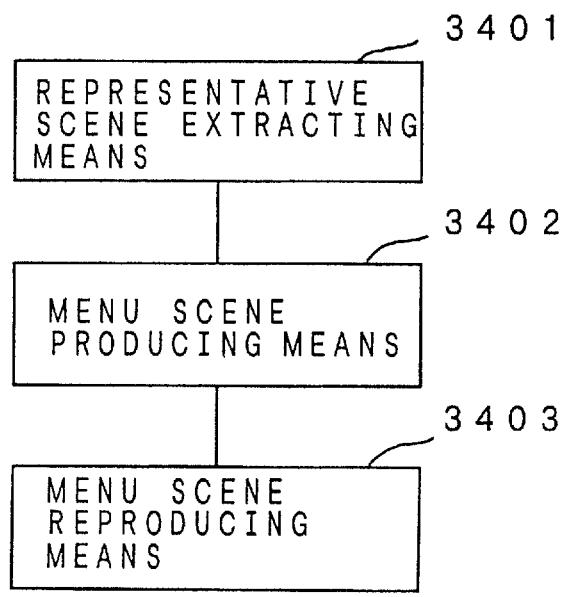
FIG. 34 is an illustration of an arrangement of a moving picture retrieving means based on a prior technique.
Figure 35:
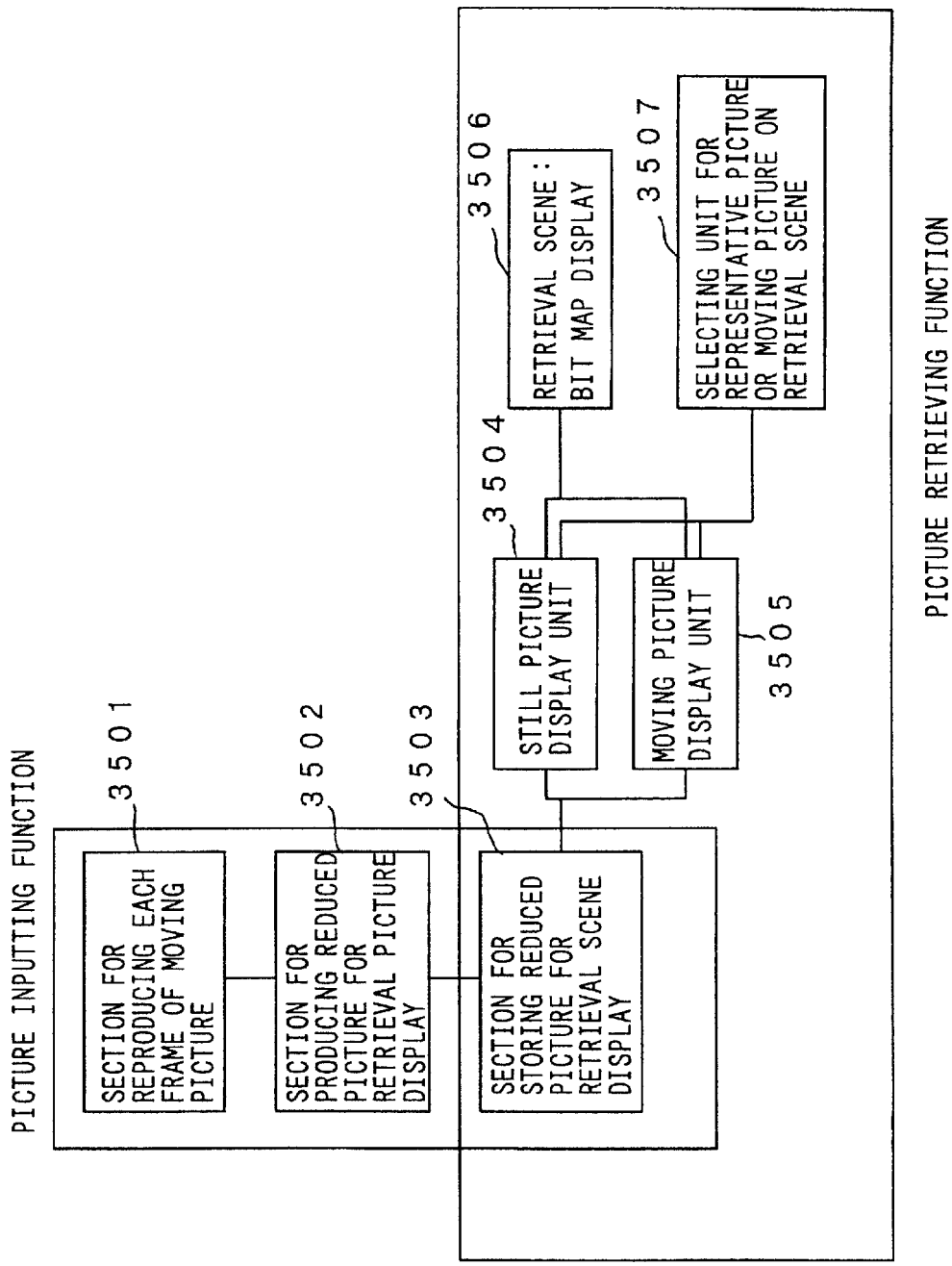
FIG. 35 is an illustration of an arrangement of a moving picture retrieving system based on a prior technique.

FIG. 31 is a block diagram showing an arrangement of a moving picture retrieving system according to a thirteenth embodiment of the present invention. A description will be made hereinbelow of only the difference from the twelfth embodiment. In FIG. 31, in each of the moving picture data meeting a retrieval condition acquired by a moving picture retrieving means 3101, a time-division extracting means 3104 extracts the moving picture data from a moving picture storage means 3102 in a state where the reproduction start times are staggered, and a picture reducing means 3105 reduces the extracted moving picture data, while as shown in FIG. 32 a picture combining means 3106 vertically arranges the picture data extracted from the moving picture data meeting the retrieval condition and reduced and further horizontally arranges the picture data extracted in a state where the reproduction start times are staggered and reduced, thus producing a combined picture. The produced combined picture is produced in a combined picture reproducing means 3123 of a moving picture retrieving terminal 3120. Whereupon, the moving picture data are more finely divided and simultaneously seen, with the result that it is possible to see all the moving picture data meeting the retrieval condition for a short time and to quickly find the directing scene, which can provide great practical effects.

As described above, the present invention offers the following effects.

In the case of simultaneously reproducing all moving picture data to be displayed with multiple scenes, the moving picture data to be reproduced are reduced, combined and reproduced in terms of the same frames of the respective moving pictures, so that they can be treated as one moving picture data, with the result that, for simultaneously reproducing a plurality of moving picture data with multi-scenes, it is possible to eliminate the trouble some control due to the decoding corresponding to the number of moving pictures reproduced. In addition, when transferring this combined picture through a network, it is possible to reduce the consumption of the network resource and system resource.

In the case of simultaneously reproducing a portion of moving picture data to be displayed with multi-scenes, in terms of the moving picture data to be reproduced, the respective moving picture data are reduced in units of frames. On the other hand, in terms of the moving picture data free from the reproduction, the data of the frames displayed at the reproduction are reduced. The reproduced pictures to be reproduced and the reduced pictures not reproduced are combined and reproduced, thereby eliminating the useless data.

Furthermore, in the case of retrieving moving picture data using a still picture as a key, the picture of the representative frame of each scene of the moving picture data is compared with the key picture, with the result that the retrieval processing speed can increase.

Still further, in the case of retrieving moving picture data using a still picture as a key, the frame with the moving picture coinciding with the key picture is newly registered as a key picture so that the retrieval is again done with the newly registered key picture, thus preventing the detection omission.

In the case of retrieving moving picture data using a still picture as a key, the picture of the representative frame of each scene of the moving picture data is compared with the key picture, and the frame, most similar to the key picture, within the scene including the frame with the coinciding moving picture is newly registered as a key picture so that the retrieval is again done with the newly registered key picture, thereby further improving the retrieval accuracy.

On the server side, a plurality of moving picture data to be reproduced are reduced at every frame and combined to produce one moving picture which in turn, is reproduced on the terminal side. Thus, for simultaneously reproducing a plurality of moving picture data with multi-scenes, the number of streams of the data to be forwarded decreases, with the result that it is possible to effectively use the band of the network taken for the transmission and reception of the combined picture. In addition, it is possible to reduce the consumption of the system resource of the computer terminal performing the reproduction.

Moreover, the moving picture retrieving server conducts the extraction, the reduction, the combination and transmission of a plurality of moving picture data meeting a retrieval condition, while the moving picture retrieving terminal receives and displays the combined picture. Whereupon, even in the case of simultaneously displaying a plurality of moving picture data meeting the retrieval condition on a screen, since the terminal receives the moving picture data reduced and combined in the moving picture retrieving server through a network and reproduce it, it is possible to reduce the system resource such as a memory and a disk up and the load on the network to the quantity corresponding to one moving picture data.

Furthermore, the moving picture retrieving server is equipped with the frame spacing setting means for setting, on the basis of the time taken for the production of a combined picture with a given number of frames, the frame spacing taken when the moving picture retrieving means derives moving picture data, and the frame spacing of the combined picture made by the reduction and combination of a plurality of moving picture data meeting the retrieval condition is changed on the basis of the frame spacing set by the frame spacing setting means, with the result that it is possible to smoothly transmit moving pictures to the moving picture retrieving terminal in accordance with the load on the server. In addition, the time to be taken for the production of a combined picture is calculated to adjust the frame interval of picture data to be combined in accordance with the load on a server, with the result that, in accordance with the load on the server, unbroken moving pictures are transmittable to the moving picture retrieving terminal.

Still further, in the combined picture transmission control means of the moving picture retrieving server, the frame number of the produced combined picture is compared with the frame number of the combined picture transmitted to the moving picture retrieving terminal, and when the frame number of the combined picture transmitted to the moving picture retrieving terminal becomes equal to or higher than the frame number of the produced combined picture, subsequently the transmission is conducted from the head frame and the reproduction of the produced combined picture is repeated, and hence, it is possible to reproduce the moving picture data meeting the retrieval condition without waiting for the completion of the production of all the combined moving picture data. In addition, by repeating the reproduction in a state of making the most of the moving picture under combination, the same scene is repeatedly reproduced and the newly produced combined picture is added little by little, and therefore, finding the directing scene becomes easy.

Moreover, in the combined picture transmission control means of the moving picture retrieving server, the written frame storage means and combined picture production speed calculating means calculate the time necessary for production of the combined picture corresponding to the reproduction expected time, and when the time necessary for the production of the remaining combined picture becomes shorter than the reproduction expected time, the transmission of the combined picture is started, with the result that it is possible that the reproduction of a plurality of moving picture data meeting the retrieval condition can start after the elapse of a short waiting time without waiting for the completion of the production of the combined moving picture data corresponding to the reproduction expected time.

Furthermore, the time-division extracting means is provided so as to take out the pictures from the moving picture storage means in a state where the reproduction start times of the designated moving picture data are staggered, and further the arbitrary moving picture data designated by the picture selecting means is divided in units of times, and the picture data extracted in a state that the reproduction start times are staggered are reduced and arranged along the passage of time to produce a combined picture, with the result that it is possible to more finely retrieve the selected moving picture data and to quickly retrieve the directing scene.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A picture display unit comprising:

key picture inputting means for inputting a key picture to be used as a retrieval key;

moving picture retrieving means for retrieving moving picture data using said key picture;

picture reducing means for reducing said moving picture data retrieved;

picture combining means for combining the reduced picture data into a combined picture; and picture displaying means for displaying said combined picture, wherein said moving picture retrieving means includes:
cut point detecting means for detecting cut points of said picture data to be retrieved;
frame extracting means for extracting an arbitrary frame within a scene; and
picture comparison decision means for comparing the extracted frame with said key picture, and wherein said moving picture retrieving means further includes key picture registering means for newly registering as a key picture the frame which coincides with said key picture as the comparison result by said picture comparison decision means, and said picture comparison decision means again performs the comparison using the newly registered key picture.

2. A picture display unit comprising:

key picture inputting means for inputting a key picture to be used as a retrieval key;

moving picture retrieving means for retrieving moving picture data using said key picture;

picture reducing means for reducing said moving picture data retrieved;

picture combining means for combining the reduced picture data into a combined picture; and picture displaying means for displaying said combined picture, wherein said moving picture retrieving means includes:
cut point detecting means for detecting cut points of said picture data to be retrieved;
frame extracting means for extracting an arbitrary frame within a scene; and
picture comparison decision means for comparing the extracted frame with said key picture, and wherein said moving picture retrieving means further includes key picture registering means for newly registering as a key picture the frame, most similar to said first mentioned mentioned key picture, of all the frames within a scene including the frame which coincides with said first-mentioned key picture in the comparison result by said picture comparison decision means, and said picture comparison decision means again performs the comparison using the newly registered key picture.

3. A picture display unit as defined in claim 1, wherein said moving picture retrieving means further includes picture similarity outputting means for outputting a similarity between the frame compared in said picture comparison decision means and said key picture so that the frame with the highest similarity is registered with said key picture registering means.

4. A picture display unit as defined in claim 2, wherein said moving picture retrieving means further includes picture similarity outputting means for outputting a similarity between the frame compared in said picture comparison decision means and said key picture so that the frame with the highest similarity is registered with said key picture registering means.

5. A picture display system comprising a moving picture retrieving server for producing and transmitting scenes reduced and combined and a moving picture retrieving terminal for receiving and reproducing the reduced and combined scenes, with said server and said terminal being connected through a network to each other, said server including:
  moving picture storage means for storing moving picture data to be retrieved;
  picture reducing means for producing reduced pictures using said moving picture data;
  picture combining means for producing a combined picture using said reduced pictures;
  combined picture production control means for controlling the production of said combined picture;
  combined picture storage means for storing data on said combined picture;
  combined picture transmission control means for controlling the transmission of said combined picture data, stored in said combined picture storage means, to said terminal; and
  communication means for controlling the communication to said terminal, and said terminal including:
  communication means for controlling the communication to said server; and
  combined picture reproducing means for displaying said combined picture data produced in said server, wherein said server reduces and combines a plurality of moving picture data to produce combined picture data and transmits the produced combined picture data through said network, while said terminal receives the produced combined picture data and reproduces it as a moving picture.

6. A moving picture retrieving system comprising a moving picture retrieving server for retrieving a moving picture and a moving picture retrieving terminal for giving a demand for retrieval of a moving picture to said moving picture retrieving server, with said moving picture retrieving server and said moving picture retrieving terminal being connected through a network to each other, said moving picture retrieving server including:
  moving picture storage means for storing moving picture data to be retrieved;
  moving picture retrieving means for retrieving said moving picture data stored in said moving picture storage means;
  picture extracting means for extracting picture data at every frame from moving picture data meeting a retrieval condition which is obtained by the retrieval of said moving picture retrieving means;
  picture reducing means for producing reduced pictures on the basis of said picture data extracted by said moving picture extracting means;
  picture combining means for producing a combined picture on the basis of said reduced pictures;
  combined picture production control means for controlling the production of said combined picture;
  combined picture storage means for storing data on said combined picture;
  combined picture transmission control means for controlling the transmission of said combined picture data, stored in said combined picture storage means, to said moving picture retrieving terminal; and
  communication means for controlling the communication with said moving picture retrieving terminal, and said moving picture retrieving terminal including:
  retrieval condition inputting means for inputting a retrieval condition for moving picture data;
  communication means for controlling the communication with said moving picture retrieving server; and
  combined picture reproducing means for displaying said combined picture data produced in said moving picture retrieving server, wherein said moving picture retrieving server reduces and combines a plurality of moving picture data meeting said retrieval condition to produce combined picture data and transmits the produced combined picture data through said network, while said moving picture retrieving terminal receives said combined picture data and reproduces it as a moving picture.

7. A moving picture retrieving system as defined in claim 6, wherein said moving picture retrieving server is provided with combined picture compressing means for compressing said combined picture data produced by said picture combining means and further for making the compressed picture data stored in said combined picture storage means while said moving picture retrieving terminal is equipped with combined picture extending means for extending said combined picture data received through said communication means and further for outputting the extended combined picture data to said combined picture reproducing means so that compressed data is used for the storage of said combined picture data and the communication between said moving picture retrieving server and said moving picture retrieving terminal.

8. A moving picture retrieving system as defined in claim 6, wherein said moving picture retrieving server is provided with frame spacing setting means for setting a frame spacing, taken when said moving picture retrieving means derives said moving picture data, on the basis of the time taken for the production of a combined picture having a given number of frames so that in said picture extracting means an extraction frame spacing for a plurality of moving picture data meeting said retrieval condition is changed on the basis of the frame spacing set by said frame spacing setting means.

9. A moving picture retrieving system as defined in claim 6, wherein said combined picture transmission control means includes:
  written frame storage means for storing a frame number of said combined picture produced by said picture combining means;
  transmission start control means for controlling the transmission start of said combined picture on the basis of said written frame number stored in said written frame storage means;
  transmission frame storage means for storing the frame number of said combined picture transmitted from said moving picture retrieving server to said moving picture retrieving terminal;
  frame comparing means for comparing the frame number of the produced combined picture stored in said written frame storage means with the frame number of said combined picture transmitted from said moving picture retrieving server to said moving picture retrieving terminal and stored in said transmission frame storage means to set a frame number to be transmitted next; and combined picture transmitting means for reading out the combined picture corresponding to said transmission frame number, set by said frame comparing means, from said combined picture storage means and further for outputting it to said communication means, wherein said combined picture transmission control means compares the frame number of the produced combined picture with the frame number of said combined picture transmitted to said moving picture retrieving terminal, and when the frame number of said combined picture transmitted to said moving picture retrieving terminal becomes equal or higher than the frame number of the produced combined picture, the frame number to be transmitted next is set as being the head and the reproduction of the produced combined picture is repeated.

10. A moving picture retrieving system as defined in claim 6, wherein said combined picture transmission control means includes:

written frame storage means for storing a frame number of said combined picture produced by said picture combining means;

combined picture production speed calculating means for calculating a production speed of a combined picture on the basis of the frame number stored in said written frame storage means and the time that the frame number is written;

transmission start control means for controlling the transmission start on the basis of the production speed of said combined picture obtained by said combined picture production speed calculating means and a reproduction expected time;

reproduction expected time storage means for storing a reproduction expected time for combined moving picture data;

transmission frame storage means for storing the frame number of said combined picture transmitted from said moving picture retrieving server to said moving picture retrieving terminal;

frame comparing means for comparing the frame number of the produced combined picture stored in said written frame storage means with the frame number of said combined picture transmitted from said moving picture retrieving server to said moving picture retrieving terminal and stored in said transmission frame storage means to set a frame number to be transmitted next; and combined picture transmitting means for reading out the combined picture corresponding to the transmission frame number, set by said frame comparing means, from said combined picture storage means and further for transmitting it to said communication means, wherein said written frame storage means and said combined picture production speed calculating means calculate the time necessary for the production of a combined picture corresponding to said reproduction expected time, and when the time necessary for the production of the remaining combined picture becomes shorter than said reproduction expected time, the transmission of said combined picture starts.

11. A moving picture retrieving system as defined in claim 6, wherein said moving picture retrieving terminal is provided with picture selecting means for selecting desired moving picture data from a combined moving picture produced by the reduction and combination of a plurality of moving picture data meeting said retrieval condition, while said moving picture retrieving server is equipped with scene division-number storage means for storing the number of divisions of a combined picture and time-division extracting means for extracting pictures from said moving picture storage means in a state where the reproductions times of moving picture data designated are staggered, and said moving picture retrieving server reduces the picture data obtained by dividing arbitrary moving picture data designated by said picture selecting means in units of time into the number stored in said scene division-number storage means and by extracting them, and arranges the reduced picture data in the order of time to produce said combined picture.

12. A moving picture retrieving system comprising a moving picture retrieving server for retrieving a moving picture and a moving picture retrieving terminal for giving a demand for retrieval of a moving picture to said moving picture retrieving server, with said moving picture retrieving server and said moving picture retrieving terminal being connected through a network to each other, said moving picture retrieving server including:
moving picture storage means for storing moving picture data to be retrieved;
moving picture retrieving means for retrieving said moving picture data stored in said moving picture storage means;
time-division extracting means for extracting pictures from said moving picture storage means in a state where the reproduction start times of a plurality of designated moving picture data are staggered;
picture reducing means for producing reduced pictures on the basis of said picture data extracted by said moving picture extracting means;
picture combining means for producing a combined picture on the basis of said reduced pictures;
combined picture production control means for controlling the production of said combined picture;
combined picture storage means for storing data on said combined picture;
combined picture transmission control means for controlling the transmission of said combined picture data, stored in said combined picture storage means, to said moving picture retrieving terminal; and
communication means for controlling the communication with said moving picture retrieving terminal, and said moving picture retrieving terminal including:
retrieval condition inputting means for inputting a retrieval condition for moving picture data;
communication means for controlling the communication with said moving picture retrieving server; and
combined picture reproducing means for displaying said combined picture data produced in said moving picture retrieving server, wherein said time-division extracting means extracts said moving picture data stored in said moving picture storage means, while said picture combining means arranges, in the order of time, the reduced moving picture data meeting said retrieval condition and the reduce picture data extracted in a state where the reproduction start times of said moving picture data meeting said retrival, condition are stagged, thereby producing said combined.

* * * * *